United States Patent
Yu et al.

(10) Patent No.: US 12,160,536 B2
(45) Date of Patent: Dec. 3, 2024

(54) TOUCHSCREEN, ELECTRONIC DEVICE, AND DISPLAY CONTROL METHOD

(71) Applicant: Honor Device Co., Ltd., Shenzhen (CN)

(72) Inventors: Junfeng Yu, Shenzhen (CN); Xiao Xiao, Shenzhen (CN); Weigang Cai, Shenzhen (CN); Hongda Chen, Shenzhen (CN); Jianli Shao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 65 days.

(21) Appl. No.: 17/754,740

(22) PCT Filed: Jul. 20, 2020

(86) PCT No.: PCT/CN2020/103113
§ 371 (c)(1),
(2) Date: Apr. 11, 2022

(87) PCT Pub. No.: WO2021/073185
PCT Pub. Date: Apr. 22, 2021

(65) Prior Publication Data
US 2024/0073305 A1    Feb. 29, 2024

(30) Foreign Application Priority Data

Oct. 15, 2019   (CN) .......................... 201910979195.1

(51) Int. Cl.
*G06F 3/044* (2006.01)
*G06F 3/01* (2006.01)
*H04M 1/02* (2006.01)
*H04W 52/02* (2009.01)

(52) U.S. Cl.
CPC .......... *H04M 1/0266* (2013.01); *G06F 3/017* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 8,680,877 B2 | 3/2014 | Kew et al. | |
| 9,002,419 B2 * | 4/2015 | Satou | G06F 3/041 |
| | | | 455/90.3 |
| 9,389,688 B2 * | 7/2016 | Tossavainen | H04R 7/04 |
| 9,703,403 B2 | 7/2017 | Nunomaki | |
| 9,785,344 B2 * | 10/2017 | Lai | G06F 3/04886 |

(Continued)

FOREIGN PATENT DOCUMENTS

| CN | 103257777 A | 8/2013 |
|---|---|---|
| CN | 103713821 A | 4/2014 |

(Continued)

*Primary Examiner* — Sepehr Azari
(74) *Attorney, Agent, or Firm* — Slater Matsil, LLP

(57) ABSTRACT

A method includes: when it is determined that a user's gesture of moving an electronic device is a preset gesture, obtaining a capacitance measurement value sensed at a contact in a preset area of the touchscreen, where the preset area is located in a peripheral edge area of the touchscreen; and when the obtained capacitance measurement value meets a first preset condition, controlling display status switching of the touchscreen.

18 Claims, 17 Drawing Sheets

(56) References Cited

U.S. PATENT DOCUMENTS

| | | |
|---|---|---|
| 10,060,732 B2 | 8/2018 | Lee et al. |
| 10,845,376 B2 | 11/2020 | Tohru et al. |
| 2002/0149571 A1* | 10/2002 | Roberts .............. G06F 3/04142 |
| | | 345/173 |
| 2008/0018611 A1* | 1/2008 | Serban ................ H03K 17/975 |
| | | 345/173 |
| 2012/0327001 A1* | 12/2012 | Higginson .......... G06F 3/04886 |
| | | 345/173 |
| 2013/0076688 A1 | 3/2013 | Tokutake |
| 2014/0143678 A1 | 5/2014 | Mistry et al. |
| 2014/0145836 A1* | 5/2014 | Tossavainen ............ H04R 7/04 |
| | | 340/407.2 |
| 2014/0168126 A1* | 6/2014 | Yu ...................... G06F 3/04886 |
| | | 345/173 |
| 2014/0320434 A1* | 10/2014 | Pantel .................... G06F 3/017 |
| | | 345/173 |
| 2016/0070399 A1 | 3/2016 | Hotelling |
| 2016/0187994 A1* | 6/2016 | La ........................... G06F 3/147 |
| | | 345/619 |
| 2016/0378255 A1* | 12/2016 | Butler ................... G06F 3/0346 |
| | | 345/174 |
| 2017/0031476 A1* | 2/2017 | Kung ................... G06F 3/0447 |
| 2017/0153737 A1* | 6/2017 | Chawda ............... G06F 3/0418 |
| 2017/0153760 A1* | 6/2017 | Chawda ............... G06F 3/0418 |
| 2017/0357439 A1* | 12/2017 | Lemay .................... H04M 1/67 |
| 2018/0088702 A1* | 3/2018 | Shutzberg ............. G06F 1/1656 |
| 2020/0396853 A1 | 12/2020 | Fang et al. |
| 2022/0057888 A1* | 2/2022 | Li ......................... G01J 1/0271 |

FOREIGN PATENT DOCUMENTS

| | | |
|---|---|---|
| CN | 104598076 A | 5/2015 |
| CN | 107102775 | 8/2017 |
| CN | 107527523 A | 12/2017 |
| CN | 107527524 A1 | 12/2017 |
| CN | 108196709 A | 6/2018 |
| CN | 108600557 A | 9/2018 |
| CN | 207946949 U | 10/2018 |
| CN | 108769350 A | 11/2018 |
| CN | 109074158 A | 12/2018 |
| CN | 109074175 A | 12/2018 |
| CN | 110113478 A | 8/2019 |
| CN | 110286790 A | 9/2019 |
| CN | 110989852 A | 4/2020 |
| CN | 111338511 A | 6/2020 |
| JP | 2014168309 A | 9/2014 |
| RU | 2506628 C2 | 2/2014 |
| RU | 2628174 C2 | 8/2017 |
| WO | 2013157270 A1 | 10/2013 |
| WO | 2018205686 A1 | 11/2018 |

\* cited by examiner

TOUCHSCREEN, ELECTRONIC DEVICE, AND DISPLAY CONTROL METHOD

CROSS-REFERENCE TO RELATED APPLICATIONS

This application is a national stage of International Application No. PCT/CN2020/103113, filed on Jul. 20, 2020, which claims priority to Chinese Patent Application No. 201910979195.1, filed on Oct. 15, 2019. Both of the aforementioned applications are hereby incorporated by reference in their entireties.

TECHNICAL FIELD

This application relates to the field of terminal technologies, and in particular, to a touchscreen, an electronic device, and a display control method.

BACKGROUND

Currently, when a user answers a call by using an electronic device such as a mobile phone or a smartwatch, if the electronic device detects that an obstruction (for example, a finger or a face of a person) is getting closer to a screen, the screen may be turned off, so as to prevent misoperation from being caused when the face of a user is in contact with the screen when the user answers the call, and save power of the electronic device; and when the electronic device detects that the obstruction is getting away from the screen, the screen may be turned on, so that the electronic device may display information or receive an input operation of the user.

As a user' requirement for the screen-to-body ratio become higher, a border on the top of a screen of an electronic device becomes narrower (or even disappears), and a proximity light sensor cannot be accommodated. Therefore, a solution of implementing proximity detection by installing a proximity light sensor in a border on a screen of an electronic device is no longer applicable. To ensure that a narrow border or borderless electronic device has a proximity detection function, in the prior art, a capacitive touchscreen capacitive sensing technology is used to implement proximity detection.

However, in actual application, capacitance data sensed by the touchscreen is highly susceptible to interference from a surrounding environment (for example, deformation of a metal sheet in the touchscreen, ambient temperature, ambient humidity, human sweat, and static electricity), and consequently, proximity detection accuracy is poor, and further display control accuracy of the electronic device is poor, and user experience is poor.

SUMMARY

Embodiments of this application provide a touchscreen, an electronic device, and a display control method, so as to resolve a technical problem in the prior art that proximity detection accuracy of an electronic device is relatively poor and a display control accuracy of the electronic device is poor.

According to a first aspect, a touchscreen is provided, including a middle-frame screen compartment, a support member, a display module, and a touch module, where the middle-frame screen compartment forms an accommodation space, the display module is disposed in the accommodation space formed by the middle-frame screen compartment, and the touch module is disposed on a side of the display module that is away from the middle-frame screen compartment; a metal sheet is disposed on a side of the display module that is close to the middle-frame screen compartment, and an edge of the metal sheet is fastened to both the middle-frame screen compartment and the display module; and the support member is disposed between the middle-frame screen compartment and the metal sheet to support the metal sheet.

In this embodiment of this application, when a posture of an electronic device changes, the support member may support the metal sheet, and deformation of the metal sheet due to gravity is weakened or avoided, so that a capacitance value detected by a touch module can more truly reflect a distance between an obstruction and a touchscreen, so that proximity detection accuracy is improved and a display status of the touchscreen can be more accurately controlled.

In a possible design, a first projection of the support member on a touch module side and a second projection of the metal sheet on the touch module side completely coincide with each other.

That is, in terms of a disposing range, the support member may be disposed on an entire surface within a coverage area of the metal sheet. In this way, the support member may support the entire surface of the metal sheet, so that the proximity detection accuracy can be further improved, and the display status of the touchscreen can be more accurately controlled.

In a possible design, the first projection of the support member on the touch module side is located within the second projection of the metal sheet on the touch module side, and a distance between an edge of the second projection and a center of the first projection is less than a preset value.

That is, the support member may be disposed only in a part of an area within the coverage area of the metal sheet. In this way, the metal sheet may also be supported, the proximity detection accuracy can be improved, and the display status of the touchscreen can be more accurately controlled; and a volume and a weight of the support member are reduced, which is conducive to lightening and thinning of the touchscreen.

In a possible design, the support member includes a plurality of sub-components, and all the sub-components are arranged at intervals in a first direction, where the first direction is any direction perpendicular to a direction in which the display module and the touch module are stacked.

In this way, the entire surface of the metal sheet may be supported relatively evenly, so that the proximity detection accuracy is improved, the display status of the touchscreen can be more accurately controlled; and the volume and the weight of the support member are reduced, which is conducive to lightening and thinning of the touchscreen.

In a possible design, the support member is a foam with good electrical insulation performance.

In this way, the support member may have a good support force, and interference to another component may be avoided, which is also conducive to lightening and thinning of the touchscreen.

According to a second aspect, an electronic device is provided, where the electronic device includes the touchscreen according to any one of the first aspect or the possible designs of the first aspect.

In this way, when a posture of the electronic device changes, the support member in the screen can support the metal sheet, and deformation of the metal sheet due to gravity is weakened or avoided, so that a capacitance value detected by a touch module can more truly reflect a distance between an obstruction and a touchscreen, so that proximity detection accuracy is improved and a display status of the touchscreen can be more accurately controlled.

According to a third aspect, a display control method is provided, where the method is applied to an electronic device, and the electronic device includes a touchscreen. The method includes: when it is determined that a user's gesture of moving the electronic device is a preset gesture, obtaining a capacitance measurement value sensed at a contact in a preset area of the touchscreen, where the preset area is located in a peripheral edge area of the touchscreen; and when the obtained capacitance measurement value meets a first preset condition, controlling display status switching of the touchscreen.

In this embodiment of this application, a processor selects a preset area in the touchscreen to generate the capacitance measurement value, so as to detect that the obstruction is getting closer to or away from the touchscreen, and then control display status switching of the touchscreen. Because the preset area is located in the peripheral edge area of the touchscreen, and interference of metal deformation on the capacitance measurement value generated in the area is relatively small, a calculation result (that is, getting closer or getting away) is more accurate than a result (that is, getting closer or getting away) obtained through calculation based on a capacitance value of an entire screen, so that proximity detection accuracy of the electronic device can be improved, and the display status of the electronic device can be more accurately controlled.

In a possible design, the first preset condition may include: The capacitance measurement value is in a monotonically increasing trend in a first period, and a capacitance measurement value at an end time of the first period is greater than a first preset threshold. Correspondingly, the controlling display status switching of the touchscreen may include: controlling the display status of the touchscreen to switch from screen-on to screen-off.

In this way, accuracy of detecting, by the electronic device, that the obstruction is getting closer can be improved, and the electronic device can be more accurately controlled to switch from screen-on to screen-off.

In a possible design, the first preset condition may include: The capacitance measurement value is in a monotonically decreasing trend in the first period, and a capacitance measurement value at an end time of the first period is less than a second preset threshold. Correspondingly, the controlling display status switching of the touchscreen may include: controlling the display status of the touchscreen to switch from screen-off to screen-on.

In this way, accuracy of detecting, by the electronic device, that the obstruction is getting away can be improved, and the electronic device can be more accurately controlled to switch from screen-off to screen-on.

According to a fourth aspect, a display control method is provided, where the method is applied to an electronic device, and the electronic device includes a touchscreen. The method includes: when it is determined, based on first acceleration data, that a user's gesture of moving the electronic device is a preset gesture, obtaining a capacitance measurement value collected by the touchscreen in a second period, where the first acceleration data is acceleration data that is of the electronic device in a first period and that is collected based on a first sampling frequency; when the obtained capacitance measurement value meets a second preset condition, re-determine, based on second acceleration data, whether the user's gesture of moving the electronic device is the preset gesture, where the second acceleration data is acceleration data that is of the electronic device in a third period and that is collected based on a second sampling frequency, and duration of the third period is greater than duration of the first period and/or the first sampling frequency is less than the second sampling frequency; and when it is re-determined that the user's gesture of moving the electronic device is the preset gesture, controlling display status switching of the touchscreen.

In this embodiment of this application, after determining that the obtained capacitance measurement value meets the second preset condition, the electronic device further adds a step of determining a gesture (that is, re-determining, based on the second acceleration data, whether the user's gesture of moving the electronic device is the preset gesture). In this way, even if the capacitance value sensed by the touchscreen is interfered with by a surrounding environment, this gesture determining step can further ensure display control accuracy of the electronic device and improve user experience.

In a possible design, the second preset condition includes: The capacitance measurement value is in a monotonically increasing trend in the second period, and a capacitance measurement value at an end time of the second period is not greater than a first preset threshold. Correspondingly, the controlling display status switching of the touchscreen includes: controlling the display status of the touchscreen to switch from screen-on to screen-off.

In this way, accuracy of detecting, by the electronic device, that the obstruction is getting closer can be improved, and the electronic device can be more accurately controlled to switch from screen-on to screen-off.

In a possible design, the second preset condition includes: The capacitance measurement value changes in a monotonically decreasing trend in a second period, and a capacitance measurement value at an end time of the second period is not less than a second preset threshold. Correspondingly, the controlling display status switching of the touchscreen includes: controlling the display status of the touchscreen to switch from screen-off to screen-on.

In this way, accuracy of detecting, by the electronic device, that the obstruction is getting away can be improved, and the electronic device can be more accurately controlled to switch from screen-off to screen-on.

According to a fifth aspect, an embodiment of this application further provides an electronic device, where the electronic device includes a touchscreen, a processor, and a memory, and the memory is configured to store one or more computer programs. When the one or more computer programs stored in the memory are executed by the processor, the electronic device is enabled to implement the technical solution in any one of the third aspect or the possible designs of the third aspect; or when the one or more computer programs stored in the memory are executed by the processor, the electronic device is enabled implement the technical solution in any one of the fourth aspect or the possible designs of the fourth aspect.

According to a sixth aspect, an embodiment of this application further provides an electronic device, where the electronic device includes a module/unit that executes the method according to any one of the third aspect or the possible designs of the third aspect; or the electronic device includes a module/unit that executes the method according to any one of the fourth aspect or the possible designs of the fourth aspect. These modules/units may be implemented by hardware, or may be implemented by executing corresponding software by hardware.

According to a seventh aspect, an embodiment of this application further provides a chip, where the chip is coupled to a memory in an electronic device, and is configured to invoke a computer program stored in the memory and execute the technical solution in any one of the third aspect or the possible designs of the third aspect of the embodiments of this application; or the chip is configured to invoke a computer program stored in a memory and execute the technical solution in any one of the fourth aspect or the possible designs of the fourth aspect of the embodiments of this application. In this embodiment of this application, "coupling" means that two components are directly or indirectly combined with each other.

According to an eighth aspect, an embodiment of this application further provides a computer readable storage medium, where the computer readable storage medium includes a computer program. When the computer program is run on an electronic device, the electronic device is enabled to execute the technical solution in any one of the third aspect or the possible designs of the third aspect of the embodiments of this application; or when the computer program is run on the electronic device, the electronic device is enabled to execute the technical solution in any one of the fourth aspect or the possible designs of the fourth aspect of the embodiments of this application.

According to a ninth aspect, an embodiment of this application provides a program product, including an instruction. When the program product runs on an electronic device, the electronic device is enabled to execute the technical solution in any one of the third aspect or the possible designs of the third aspect of the embodiments of this application; or when the program product runs on the electronic device, the electronic device performs the technical solution in any one of the fourth aspect or the possible designs of the fourth aspect of the embodiments of this application.

DETAILED DESCRIPTION OF ILLUSTRATIVE EMBODIMENTS

As described in the background, in a conventional technical solution, proximity detection of an electronic device is generally implemented by installing a proximity light sensor in a frame above a screen of the electronic device. The proximity light sensor generally includes two parts: One part is a light emitting diode (Light Emitting Diode, LED), which is used to emit near infrared light; and the other part is a photosensitive sensor that is sensitive to near infrared light. When the obstruction is getting closer to the electronic device, more near infrared light will be received by the photosensitive sensor, and when the near infrared light received by the photosensitive sensor is greater than an upper limit, the screen is turned off. When the obstruction is getting away from the electronic device, less near infrared light will be received by the photosensitive sensor, and when the near infrared light received by the photosensitive sensor is less than a lower limit, the screen is turned on. However, as a screen-to-body ratio of an electronic device continuously increases, a frame above a screen becomes narrower (or even disappears), and a proximity light sensor cannot be accommodated. To ensure that such an electronic device also has a proximity detection function, some existing technologies propose to use a capacitive sensing technology of a capacitive touchscreen to implement proximity detection.

Figure 1A:
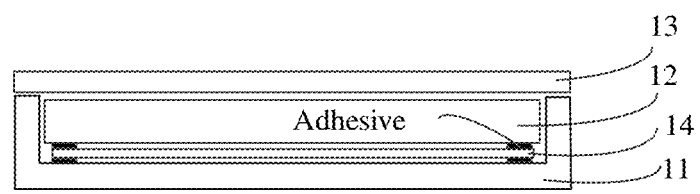
FIG. 1A and FIG. 1B are schematic structural diagrams of a touchscreen of an electronic device in the prior art.
Figure 1B:
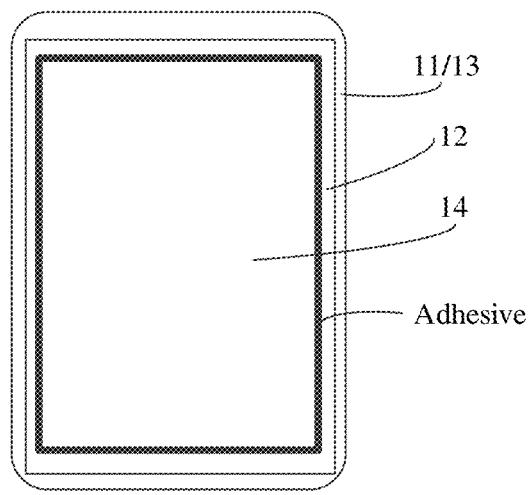

FIG. 1A and FIG. 1B are schematic structural diagrams of a touchscreen of an electronic device in the prior art. Referring to FIG. 1A and FIG. 1B, the touchscreen includes a middle-frame screen compartment 11, a display module 12 disposed in an accommodation space formed by the middle-frame screen compartment 11, and a touch module 13 disposed above the display module. A metal sheet 14 is disposed on a side of the display module 12 that is close to the bottom of the middle-frame screen compartment 11, and an edge of the metal sheet 14 is bonded and fastened to both the middle-frame screen compartment 11 and the display module 12 by using adhesive. In FIG. 1A and FIG. 1B, a black filled part is used to represent adhesive. The metal sheet 14 can better fasten the display module 12, so as to ensure stability of the display module 12.

When the obstruction is getting closer to or getting away from the touchscreen within a specific range from the touchscreen, a capacitance value of an capacitive sensor at the corresponding contact position on the touch module 13 changes (for example, the capacitance value increases when the obstruction is getting closer to the touchscreen, and decreases when the obstruction is getting away from the touchscreen, and the capacitance value is the highest when the obstruction is in contact with the touch module 13). Therefore, in principle, proximity detection may be implemented by detecting a change rule of the capacitance value on the touch module 13.

However, in actual application, a capacitance value sensed by the touchscreen is highly susceptible to interference from a surrounding environment, for example, deformation of a metal sheet in the touchscreen, ambient temperature, ambient humidity, sweat of the obstruction, and static electricity.

Figure 2A:
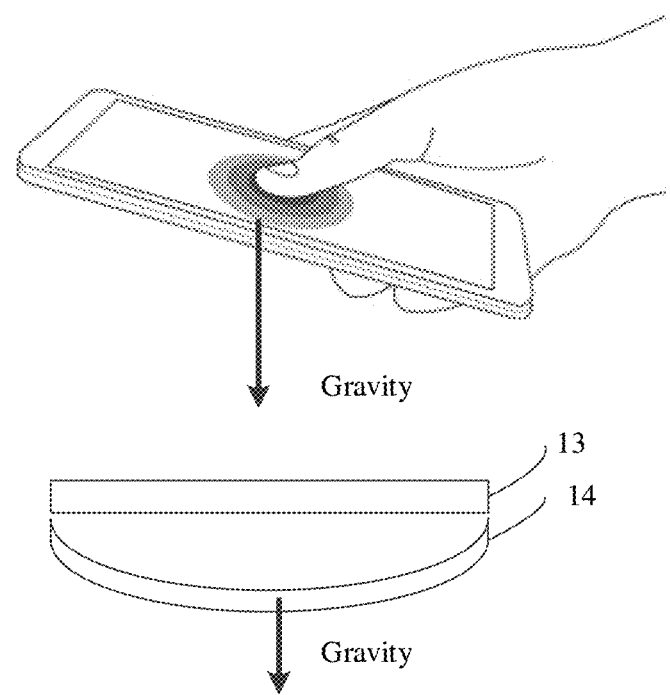
FIG. 2A, FIG. 2B, and FIG. 2C are schematic diagrams when a screen of an electronic device is facing up, perpendicular to a horizontal direction, and facing down, respectively.
Figure 2B:
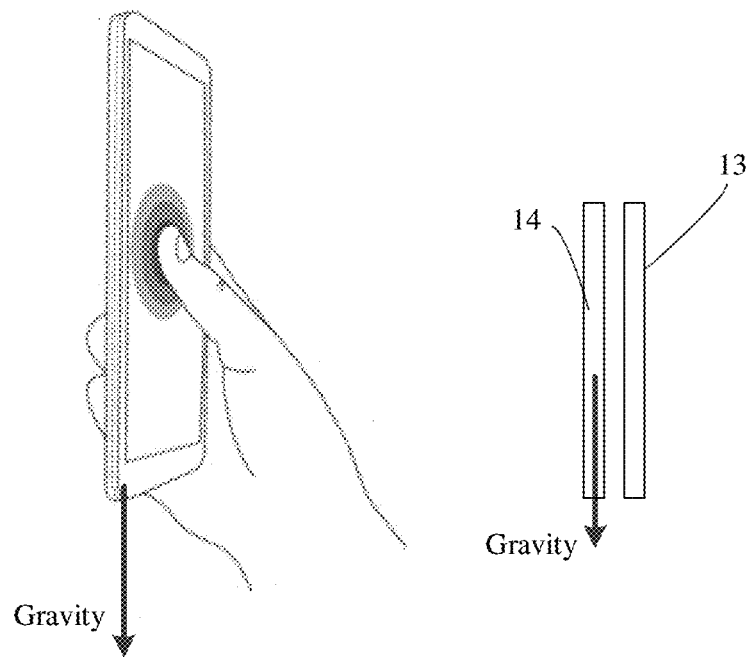
Figure 2C:
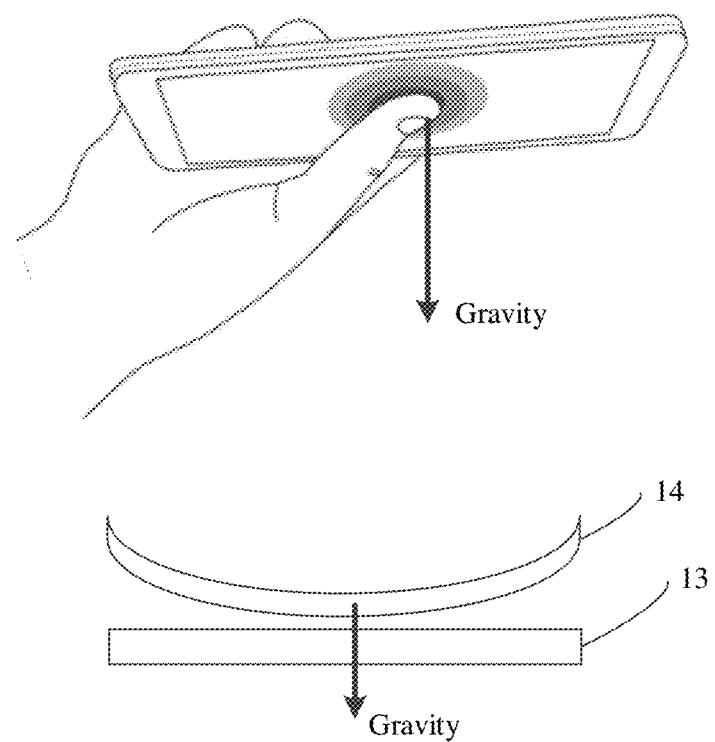

Deformation of the metal sheet is used as an example: When the electronic device is getting closer to or getting away from the obstruction, a posture of the electronic device generally changes, for example, a user picks up, puts down, or flips the electronic device when answering a call. Because a middle area of the metal sheet 14 in the touchscreen is not fastened with adhesive, it will deform to a greater extent under the influence of gravity. When the electronic device is in different postures, a degree of deformation of the metal sheet 14 is also different. For example, FIG. 2A, FIG. 2B, and FIG. 2C are schematic diagrams when a screen of an electronic device is facing up, perpendicular to a horizontal direction, and facing down, respectively. When the screen of the electronic device is facing up, as shown in FIG. 2A, a distance between the metal sheet 14 and the touch module 13 increases. When the screen of the electronic device is facing down, as shown in FIG. 2C, the distance between the metal sheet 14 and the touch module 13 becomes smaller. When the screen of the electronic device is perpendicular to the horizontal direction, as shown in FIG. 2B, the amount of change in the distance between the metal sheet 14 and the touch module 13 is relatively small. When the metal sheet 14 is deformed to a different degree, a different inductive capacitance is generated between the metal sheet 14 and another metal layer in the electronic device, so that the capacitance value of the capacitive sensor on the touch module 13 is interfered with to a different degree.

Generally, a capacitance value generated by the touch module 13 when the obstruction is near the touchscreen but is not in contact with the touchscreen is far less than a capacitance value generated by the touch module 13 when the obstruction is in contact with the touchscreen. In a scenario in which the touch module 13 is used only for touch detection (for example, for detecting an input operation performed by a user) in the past, because a magnitude of a capacitance value generated when the obstruction is in contact with the touchscreen is relatively large (a capacitance value obtained when the obstruction is in contact with the touchscreen (that is, a capacitance value obtained when a distance between the obstruction and the touch module 13 is 0 mm) is marked as 100% herein), a threshold used to detect whether the obstruction is in contact with the touchscreen is set to a relatively large value, and a capacitance interference caused by an environmental factor (for example, a capacitance interference caused by deformation of the metal sheet 14) is generally about 20% of the capacitance value obtained when the obstruction is in contact with the touchscreen, and therefore may be omitted. However, in a scenario in which the touch module 13 is used for proximity detection, when the obstruction is near the touchscreen but is not in contact with the touchscreen (a distance between the obstruction and the touch module 13 is approximately in a range of 20 mm to 5 mm), a magnitude of a capacitance value generated by the touch module 13 is relatively small, and is generally 1% to 4% of a capacitance value when the obstruction is in contact with the touch module 13. Therefore, a capacitance interference caused by these environmental factors greatly affects proximity detection accuracy of the touch module 13. Therefore, in the prior art, accuracy of detecting proximity of an obstruction based on a touchscreen is relatively poor, which results in poor display control accuracy of an electronic device, and problems such as incorrectly turning on a screen or incorrectly turning off a screen often occur. Consequently, power consumption of the electronic device is wasted greatly, and user experience is poor.

In view of this, the embodiments of this application provide the following three solutions to improve the display control accuracy of the electronic device.

In the first solution, a support member may be disposed between the metal sheet 14 and the middle-frame screen compartment 11 in the structural composition of the touchscreen of the electronic device shown in FIG. 1A and FIG. 1B. The support member supports a part of the metal sheet that is susceptible to deformation, and can effectively resist or avoid deformation of the metal sheet, so as to improve proximity detection accuracy of the electronic device, and further more accurately control a display status of the electronic device.

In the second solution, when proximity detection is performed based on the structure of the touchscreen of the electronic device shown in FIG. 1A and FIG. 1B and based on a capacitance value generated by the touch module 13, a capacitance value sensed in a corresponding edge area of the metal plate 14 (that is, an area that is not susceptible to deformation) in the touch module 13 may be selected (for example, a capacitance value sensed at a first three lines of contact positions on the touch module 13) to calculate a distance between the obstruction and the touchscreen. An edge area of the metal sheet 14 is not susceptible to deformation. Therefore, interference on a capacitance value corresponding to this area may be relatively small, and a calculation result (that is, getting closer or getting away) is more accurate than a result (that is, getting closer or getting away) obtained through calculation based on a capacitance value of an entire screen, so that proximity detection accuracy of the electronic device can be improved, and a display status of the electronic device can be more accurately controlled.

In the third solution, based on the structure of the touchscreen of the electronic device shown in FIG. 1A and FIG. 1B, after a distance relationship between the obstruction and the electronic device that is calculated based on a capacitance value sensed by the touch module 13 meets a condition for turning off/on the screen, a gesture determining step is added: determining, based on a posture change of the electronic device, whether the event that the obstruction is getting closer to or getting away from the electronic device is accidentally triggered; and after determining that the event is not accidentally triggered, which is equivalent to determining that the user has an intention to move the electronic device closer to or away from a human body, turning off/on the screen. In this way, even if the capacitance value sensed by the touchscreen is interfered with by the surrounding environment, the gesture determining step ensures display control accuracy of the electronic device, so that user experience is improved.

It should be noted that, in this embodiment of this application, the foregoing three solutions may be separately implemented, or may be implemented in combination with each other. This is not specifically limited in this embodiment of this application.

The following describes technical solutions in the embodiments of this application with reference to the accompanying drawings in the embodiments of this application. "At least one" in the embodiments of this application means one or more, and "a plurality of" means two or more. In addition, it should be understood that, in the description of this application, words such as "first" and "second" are merely used for the purpose of distinguishing the description, cannot be understood as indicating or implying relative importance, and cannot be understood as indicating or implying a sequence.

The technical solutions provided in the embodiments of this application may be applied to electronic devices such as a mobile phone, a tablet computer, a desktop computer, a laptop computer, a ultra-mobile personal computer (ultra-mobile personal computer, UMPC), a handheld computer, a netbook, a personal digital assistant (personal digital assistant, PDA), a wearable electronic device, and a virtual reality device. This is not limited in the embodiments of this application.

Figure 3:
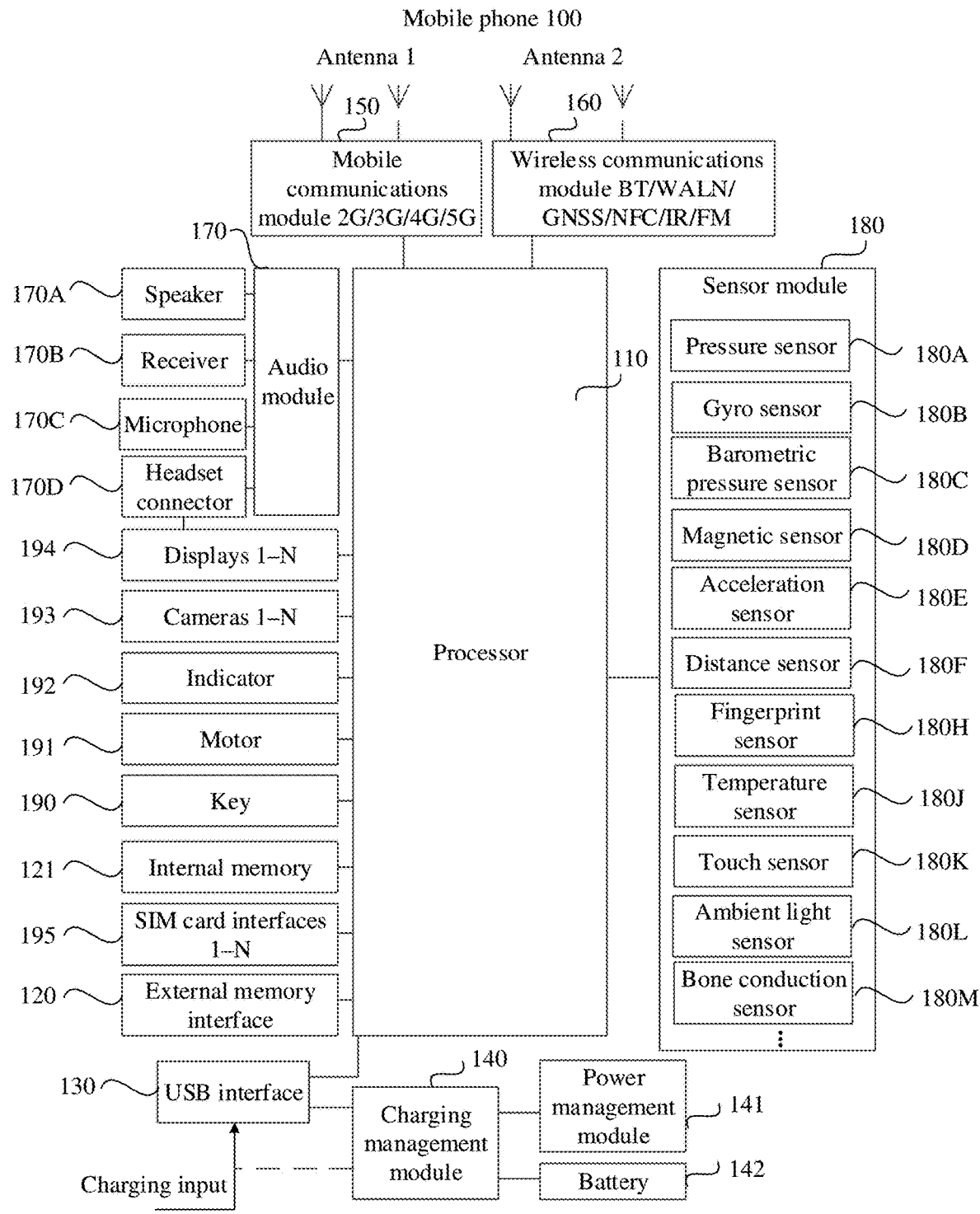
FIG. 3 is a possible schematic structural diagram of an electronic device according to an embodiment of this application.

Based on an example in which the electronic device is a mobile phone, FIG. 3 is an example schematic structural diagram of the mobile phone. As shown in FIG. 3, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 190, a motor 191, an indicator 192, a camera 193, a display 194, and a subscriber identity module (subscriber identity module, SIM) interface 195. The sensor module 180 may include a pressure sensor 180A, a gyro sensor 180B, a barometric pressure sensor 180C, a magnetic sensor 180D, an acceleration sensor 180E, a distance sensor 180F, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, or some components are combined, or some components are split, or a different component arrangement is used. The components shown may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the mobile phone 100. The controller may generate an operation control signal based on an instruction operation code and a time sequence signal, so as to control instruction retrieval and instruction execution.

A memory may also be disposed in the processor 110 to store an instruction and data. In some embodiments, the memory in the processor 110 is a cache memory. The memory may store an instruction or data that is just used or used cyclically by the processor 110. If the processor 110 needs to use the instruction or data again, the instruction or data may be directly invoked from the memory. Repeated access is avoided, and a waiting time of the processor 110 is reduced, thereby improving system efficiency.

The processor 110 may run the display control method provided in this embodiment of this application. The processor 110 may determine, based on a change trend of the capacitance value of the touchscreen, a change trend (that is, getting closer or getting away) of a distance between the obstruction and the touchscreen. For example, when the distance between the obstruction and the touchscreen becomes smaller (that is, getting closer), a capacitance value of a contact where the touchscreen is close to the obstruction increases; or when the distance between the obstruction and the capacitive touchscreen becomes larger (that is, getting away), the capacitance value of the contact where the touchscreen is close to the obstruction decreases. When determining that the distance between the obstruction and the capacitive touchscreen meets a preset condition, the processor 110 controls the touchscreen to perform a preset operation, for example, to turn on the screen or to turn off the screen.

In some embodiments, the processor 110 may further determine, after determining that the distance between the obstruction and the touchscreen meets the preset condition, whether a gesture performed by the user on the electronic device is a preset gesture. The touchscreen is controlled to perform the preset operation only when it is determined that the distance between the obstruction and the touchscreen meets the preset condition and the gesture performed by the user on the electronic device is the preset gesture. For example, the processor 110 may determine, based on acceleration data output by the acceleration sensor 180E, a gesture performed by the user on the electronic device, for example, picking up, putting down, or flipping the electronic device. Further, the processor 110 turns off the touchscreen only after detecting that the obstruction is getting closer to the touchscreen and determining that the gesture performed by the user on the electronic device is lifting, so as to reduce power consumption of the terminal device, and turns on the touchscreen only after detecting that the obstruction is getting away from the touchscreen and determining that the gesture performed by the user on the electronic device is putting down, so that the user can operate the electronic device. In this way, display control accuracy of the electronic device can be improved, and user experience can be improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using an I2C bus interface, thereby implementing a touch function and a proximity detection function of the mobile phone 100.

The I2S interface may be used for audio communication. In some embodiments, the processor 110 may include a plurality of groups of I2S buses. The processor 110 may be coupled to the audio module 170 by using an I2S bus, so as to implement communication between the processor 110 and the audio module 170. In some embodiments, the audio module 170 may transmit an audio signal to the wireless communications module 160 by using an I2S interface, so as to implement a function of answering a call by using a Bluetooth headset.

The PCM interface can also be used for audio communication, and sampling, quantizing and coding an analog signal. In some embodiments, the audio module 170 may be coupled to the wireless communications module 160 by using a PCM bus interface. In some embodiments, the audio module 170 may also transmit an audio signal to the wireless communications module 160 by using a PCM interface, so as to implement a function of answering a call by using a Bluetooth headset. Both the I2S interface and the PCM interface may be used for audio communication.

The UART interface is a universal serial data bus used for asynchronous communication. The bus may be a bidirectional communications bus. The bus is configured to convert data to be transmitted between serial communication and parallel communication. In some embodiments, the UART interface is usually configured to connect the processor 110 to the wireless communications module 160. For example, the processor 110 communicates with a Bluetooth module in the wireless communications module 160 by using the UART interface, so as to implement a Bluetooth function. In some embodiments, the audio module 170 may transmit an audio signal to the wireless communications module 160 by using the UART interface, so as to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 and the camera 193 communicate with each other by using a CSI interface, so as to implement a photographing function of the mobile phone 100. The processor 110 communicates with the display 194 by using the DSI interface, so as to implement a display function of the mobile phone 100.

The GPIO interface may be configured using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is a USB-compliant interface, and may be specifically a Mini USB interface, a Micro USB interface, a USB Type C interface, or the like. The USB interface 130 may be configured to connect to the charger to charge the mobile phone 100, or may be configured to transmit data between the mobile phone 100 and a peripheral device. The USB interface 130 may also be configured to connect to the headset, so as to play audio by using the headset. The interface may be further configured to connect to another electronic device, such as an AR device.

It may be understood that the interface connection relationship between the modules shown in this embodiment of this application is merely an illustrative description, and does not constitute a limitation on the structure of the mobile phone 100. In some other embodiments of this application, the mobile phone 100 may alternatively use an interface connection manner different from that shown in the foregoing embodiment, or use a combination of a plurality of interface connection manners.

The charging management module 140 is configured to receive a charging input from the charger. The charger may be a wireless charger, or may be a wired charger. In some wired charging embodiments, the charging management module 140 may receive the charging input from the wired charger by using the USB interface 130. In some wireless charging embodiments, the charging management module 140 may receive a wireless charging input by using a wireless charging coil of the mobile phone 100. In addition to charging the battery 142, the charging management module 140 may further supply power to the electronic device by using the power management module 141.

The power management module 141 is configured to connect the battery 142, the charging management module 140, and the processor 110. The power management module 141 receives an input of the battery 142 and/or an input of the charging management module 140, so as to supply power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health state (leakage or impedance). In some other embodiments, the power management module 141 may alternatively be disposed in the processor 110. In some other embodiments, the power management module 141 and the charging management module 140 may alternatively be disposed in a same device.

A wireless communications function of the mobile phone 100 may be implemented by using an antenna 1, an antenna 2, a mobile communications module 150, the wireless communications module 160, a modem processor, a baseband processor, and the like.

The antenna 1 and the antenna 2 are configured to transmit and receive electromagnetic wave signals. Each antenna in the mobile phone 100 may be configured to cover a single or a plurality of communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a wireless communication solution that is applied to the mobile phone 100, including 2G/3G/4G/5G. The mobile communications module 150 may include at least one filter, a switch, a power amplifier, a low noise amplifier (low noise amplifier, LNA), or the like. The mobile communications module 150 may receive an electromagnetic wave from the antenna 1, perform processing such as filtering and amplification on the received electromagnetic wave, and send the processed electromagnetic wave to the modem processor for demodulation. The mobile communications module 150 may further amplify a signal that is modulated by the modem processor, and convert the signal into an electromagnetic wave and radiate the electromagnetic wave by using the antenna 1. In some embodiments, at least some of the functional modules of the mobile communications module 150 may be disposed in the processor 110. In some embodiments, at least some of the functional modules of the mobile communications module 150 and at least some of the modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. The demodulator then transmits the demodulated low-frequency baseband signal to the baseband processor for processing. After being processed by the baseband processor, the low-frequency baseband signal is transmitted to the application processor. The application processor outputs a sound signal by using an audio device (not limited to the speaker 170A, the receiver 170B, or the like), or displays an image or a video by using the display 194. In some embodiments, the modem processor may be an independent device. In some other embodiments, the modem processor may be independent of the processor 110 and disposed in the same device as the mobile communications module 150 or another functional module.

The wireless communications module 160 may provide a wireless communication solution that is applied to the mobile phone 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communications module 160 may be one or more devices that integrate at least one communication processing module. The wireless communications module 160 receives an electromagnetic wave by using the antenna 2, modulates and filters the electromagnetic wave signal, and sends the processed signal to the processor 110. The wireless communications module 160 may further receive a to-be-sent signal from the processor 110, perform frequency modulation and amplification on the signal, and convert the signal into an electromagnetic wave and radiate the electromagnetic wave by using the antenna 2.

In some embodiments, the antenna 1 of the mobile phone 100 is coupled to the mobile communications module 150, and the antenna 2 is coupled to the wireless communications module 160, so that the mobile phone 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The mobile phone 100 implements a display function by using a GPU, the display 194, the application processor, and the like. The GPU is a microprocessor for image processing, and is connected to the display 194 and the application processor. The GPU is configured to perform mathematical and geometric calculations to render graphics. The processor 110 may include one or more GPUs that execute a program instruction to generate or change display information.

The display 194 is configured to display an image, a video, and the like. The display 194 includes a display panel, which is also referred to as a "display module". The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, quantum dot light emitting diodes (quantum dot light emitting diodes, QLED), or the like. In some embodiments, the mobile phone 100 may include one or N displays 194, where N is a positive integer greater than 1.

The touch sensor 180K is also referred to as a "touch module". The touch sensor 180K may be configured to detect a touch operation performed on or near the touch sensor 180K. The touch sensor 180K may transfer the detected touch operation to the processor 110, so as to determine a touch event type. A visual output related to a touch operation may be provided by using the display 194. The touch sensor 180K may further detect a value of a distance between an obstruction (for example, a human part such as a finger or a face) and the touchscreen, and may further transfer the detected distance value to the processor 110, so that the processor 110 controls, based on the distance between the obstruction and the touchscreen, a display status of the display, for example, screen-on or screen-off.

In this embodiment of this application, the touch sensor 180K and the display 194 may form a touchscreen, which is also referred to as a "touchscreen". In some embodiments, the touch sensor 180K may be disposed in the display 194. In some other embodiments, the touch sensor 180K may alternatively be disposed on a surface of the mobile phone 100, which is different from a position in which the display 194 is located.

Figure 4:
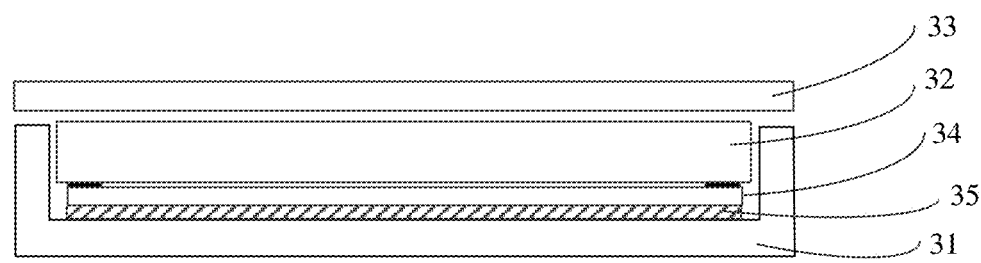
FIG. 4 is a possible schematic structural diagram of a touchscreen according to an embodiment of this application.

FIG. 4 is a possible schematic structural diagram of a touchscreen according to an embodiment of this application. The touchscreen includes a middle-frame screen compartment 31, a display module 32 disposed in an accommodation space formed by the middle-frame screen compartment 31, and a touch module 33 disposed above the display module 32. A metal sheet 34 is disposed on a side of the display module 32 that is close to the bottom of the middle-frame screen compartment 31, and an edge of the metal sheet 34 is fastened to both the middle-frame screen compartment 31 and the display module 32 (for example, may be fastened in an adhesive manner). The metal sheet 34 can ensure stability of the display module 32. The touchscreen further includes a support member 35, which is disposed on a side of the middle-frame screen box 31 that faces the display module 32, and is located below the metal sheet 34. When a posture of the electronic device changes, the support member 35 supports the metal sheet 34, weakens or even avoids deformation of the metal sheet 34 due to gravity, so that a capacitance value detected by the touch module 33 can more truly reflect a distance between an obstruction and the touchscreen, thereby improving proximity detection accuracy of the electronic device, and more accurately controlling a display status of the electronic device.

For example, a material of the support member 35 may be implemented in a plurality of manners, for example, may be a foam with good electrical insulation performance, or another electrical insulation material (for example, polyethylene terephthalate or polyfluoroethylene). In terms of a disposing range, the support member 35 may be disposed on an entire surface within a coverage area of the metal sheet 34, or may be disposed only in a partial area within the coverage area of the metal sheet 34 (for example, an area with a relatively large degree of deformation due to gravity).

Figure 5A:
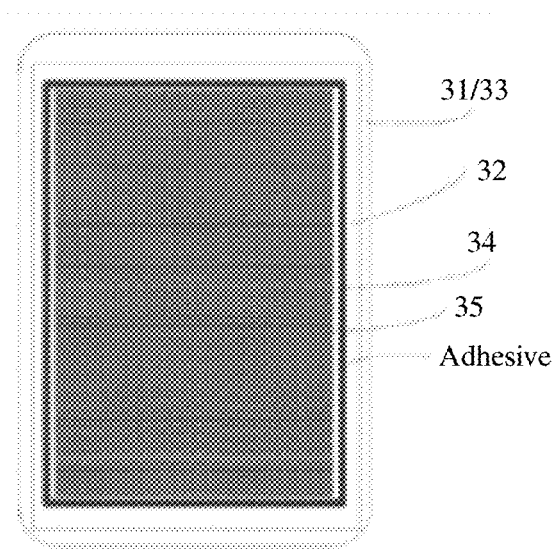
FIG. 5A, FIG. 5B, and FIG. 5C are three possible schematic diagrams of a support member according to an embodiment of this application.

For example, referring to FIG. 5A, the support member 35 is disposed on an entire surface within the coverage area of the metal sheet 34.

Figure 5B:
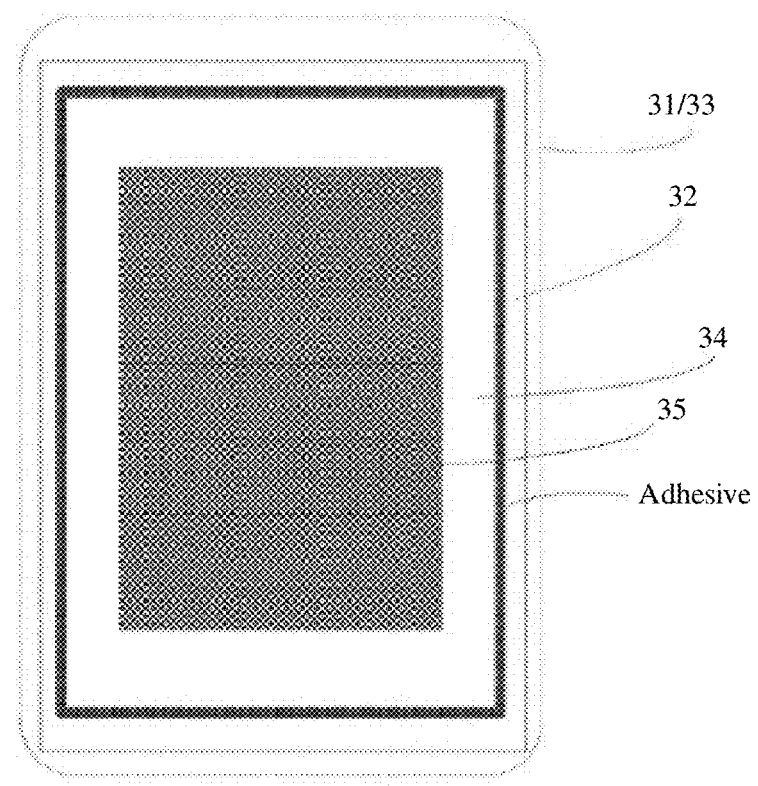

For example, referring to FIG. 5B, the support member 35 is disposed only in a center area (a position that is susceptible to deformation due to gravity) of the metal sheet 14 within the coverage area of the metal sheet 34.

Figure 5C:
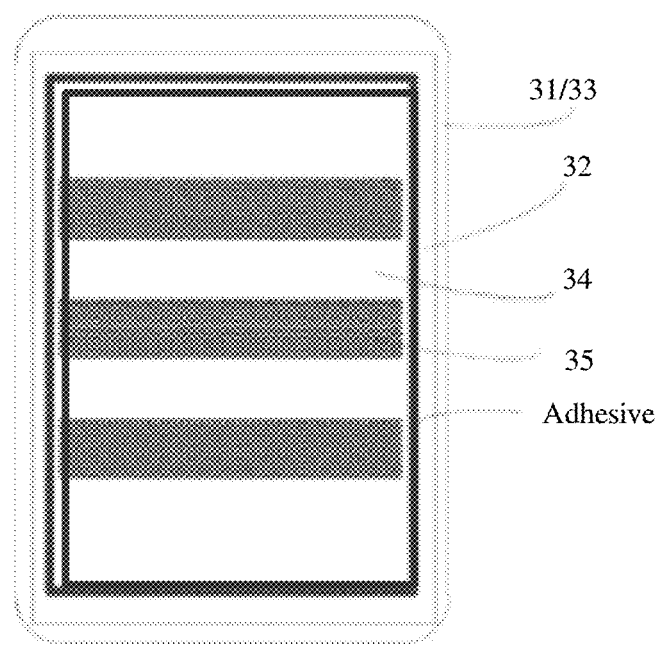

For example, referring to FIG. 5C, the support member 35 may include a plurality of sub-components, and the sub-components are disposed at intervals within the coverage area of the metal sheet 34.

Certainly, in a specific embodiment, a shape and a size of the support member 35 may be implemented in another manner. This is not specifically limited in this embodiment of this application.

The mobile phone 100 may detect, at each contact of each touchscreen, a capacitance value sensed when an obstruction is getting closer to or getting away from the touchscreen. When the mobile phone 100 detects that the capacitance value is within a preset range, it may be determined that there is an obstruction nearby. When it is detected that the capacitance value tends to decrease, it may be determined that the obstruction is getting away from the touchscreen; or when it is detected that the capacitance value tends to increase, it may be determined that the obstruction is getting closer to the touchscreen. In this way, the mobile phone 100 may detect, by using a touchscreen, that the mobile phone 100 held by a user is getting closer to an ear for making a call, so that the screen automatically turns off to save power, or detect that the mobile phone 100 held by the user is getting away from the ear, so that the screen automatically turns on for the user to operate. The proximity detection function of the touchscreen may also be used in a process of automatically unlocking or locking a screen when the mobile phone is in a leather case mode or a pocket mode.

The mobile phone wo may implement a photographing function by using an ISP, a camera 193, a video codec, a GPU, a display 194, an application processor, and the like.

The ISP is configured to process data fed back by the camera 193. For example, when photographing, a shutter is opened, light is transmitted to a photosensitive element of the camera by using a lens, an optical signal is converted into an electrical signal, and the photosensitive element of the camera transmits the electrical signal to the ISP for processing, so as to convert the electrical signal into an image visible to a naked eye. The ISP may further perform algorithm-based optimization on noise, brightness, and a skin color of an image. The ISP may further optimize parameters such as exposure and a color temperature in a photographing scenario. In some embodiments, the ISP may be disposed in the camera 193.

The camera 193 is configured to capture a still image or a video. An object generates an optical image by using a lens, and the optical image is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the mobile phone wo may include one or N cameras 193, where N is a positive integer greater than 1.

The digital signal processor is configured to process a digital signal. In addition to processing a digital image signal, the digital signal processor may also process another digital signal. For example, when the mobile phone 100 selects a frequency, the digital signal processor is configured to perform Fourier transform on energy of the frequency.

The video codec is configured to compress or decompress a digital video. The mobile phone 100 may support one or more video codecs. In this way, the mobile phone 100 may play or record videos in a plurality of coding formats, for example, moving picture experts group (moving picture experts group, MPEG)1, MPEG2, MPEG3, and MPEG4.

An NPU is a neural-network (neural-network, NN) computing processor. By using a biological neural-network structure, for example, by using a transfer mode between human brain neurons, input information is rapidly processed, and self-learning may be performed continuously. Applications such as image recognition, face recognition, voice recognition, and text understanding of the mobile phone 100 may be implemented by using the NPU.

The external memory interface 120 may be configured to connect to an external memory card, such as a Micro SD card, to extend a storage capability of the mobile phone 100. The external memory card communicates with the processor 110 by using the external storage interface 120, so as to implement a data storage function. For example, a file such as music or a video is stored in the external memory card.

The internal memory 121 may be configured to store computer executable program code, where the executable program code includes an instruction. The processor 110 executes various functional applications and data processing of the mobile phone 100 by running the instruction stored in the internal memory 121. The internal memory 121 may include a program storage area and a data storage area. The program storage area may store an operating system, an application program required by at least one function (for example, a sound play function or an image play function), or the like. The data storage area may store data (such as audio data or a phone book) created during use of the mobile phone 100. In addition, the internal memory 121 may include a high-speed random access memory, and may also include a non-volatile memory, such as at least one magnetic disk storage device, a flash memory device, or a universal flash storage (universal flash storage, UFS).

The mobile phone 100 may implement an audio function (for example, music play and recording) by using an audio module 170, a speaker 170A, a receiver 170B, a microphone 170C, a headset interface 170D, an application processor, and the like.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The mobile phone 100 may be configured to listen to music or listen to a hands-free call by using the speaker 170A.

The receiver 170B, also referred to as an "earpiece", is configured to convert an audio electrical signal into a sound signal. When the mobile phone 100 is configured to answer a call or a voice message, the receiver 170B may be placed near a human ear to answer the voice.

The microphone 170C is configured to convert a sound signal into an electrical signal. When making a call or sending a voice message, the user may put his mouth near the microphone 170C, and make a sound, so as to input a sound signal to the microphone 170C. The mobile phone 100 may be provided with at least one microphone 170C. In some other embodiments, the mobile phone 100 may be provided with two microphones 170C, so as to implement a noise reduction function addition to collecting a sound signal. In some other embodiments, the mobile phone 100 may alternatively be provided with three or more microphones 170C, so as to identify a sound source and implement a function of directional recording in addition to collecting a sound signal and noise reduction.

The headset interface 170D is configured to connect to a wired headset. The headset interface 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having a conductive material. When a force is applied to the pressure sensor 180A, capacitance between electrodes changes. The mobile phone 100 determines strength of pressure based on the change of the capacitance. When a touch operation is performed on the display 194, the mobile phone 100 detects strength of the touch operation strength by using the pressure sensor 180A. The mobile phone 100 may also calculate a position of the touch based on a detection signal of the pressure sensor 180A. In some embodiments, a touch operation that acts on a same touch position but has different touch operation strength may be corresponding to different operation instructions. For example, when a touch operation whose touch operation strength is less than a first pressure threshold acts on a short message application icon, an instruction for viewing a short message is executed. When a touch operation whose touch operation strength is greater than or equal to the first pressure threshold is performed on the short message application icon, an instruction for creating a new short message is executed.

A gyro sensor 180B may be configured to determine a movement posture of the mobile phone 100. In some embodiments, an angular velocity of the mobile phone 100 around three axes (that is, x, y, and z axes) may be determined by using the gyro sensor 180B. The gyro sensor 180B may be configured to perform image stabilization during photographing. For example, when a shutter is pressed, the gyro sensor 180B detects a shake angle of the mobile phone 100, and calculates, based on the angle, a distance that needs to be compensated by a lens module, so that the lens counteracts the shake of the mobile phone 100 through a reverse movement, thereby implementing image stabilization. The gyro sensor 180B may be further used in navigation and somatosensory game scenarios.

A barometric pressure sensor 180C is used to measure the barometric pressure. In some embodiments, the mobile phone 100 calculates an altitude by using the barometric pressure value measured by the barometric pressure sensor 180C, so as to provide assistance in positioning and navigation.

A magnetic sensor 180D includes a Hall sensor. The mobile phone 100 may detect, by using the magnetic sensor 180D, opening and closing of a flip leather case. In some embodiments, when the mobile phone 100 is a flip phone, the mobile phone 100 may detect opening and closing of a flip cover by using the magnetic sensor 180D. Further, a feature such as automatic unlocking of the flip cover is set based on the detected open/close state of the leather case or the open/close state of the flip cover.

An acceleration sensor 180E may detect a value of acceleration of the mobile phone 100 in each direction (generally three axes). When the mobile phone 100 is still, the acceleration sensor 180E can detect a value and a direction of the gravity. The acceleration sensor 180E may be further configured to identify a posture of an electronic device, and is applied to applications such as horizontal and vertical screen switching and a pedometer.

A distance sensor 180F is configured to measure a distance. The mobile phone 100 may measure a distance by using infrared or laser. In some embodiments, in a photographing scenario, the mobile phone 100 may use the distance sensor 180F to measure a distance to implement fast focusing.

The ambient light sensor 180L is configured to sense brightness of ambient light. The mobile phone 100 may adaptively adjust brightness of the display 194 based on the sensed brightness of the ambient light. The ambient light sensor 180L may also be configured to automatically adjust white balance during photographing. The ambient light sensor 180L may further cooperate with the touchscreen to detect whether the mobile phone 100 is in a pocket, so as to prevent a false touch.

A fingerprint sensor 180H is configured to collect a fingerprint. The mobile phone 100 may use a collected fingerprint feature to implement fingerprint-based unlocking, application lock access, fingerprint-based photographing, and fingerprint-based call answering.

A temperature sensor 180J is configured to detect temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of the processor near the temperature sensor 180J, so as to reduce power consumption and implement thermal protection. In some other embodiments, when the temperature is less than another threshold, the mobile phone 100 heats a battery 142 to avoid abnormal shutdown of the mobile phone 100 due to low temperature. In some other embodiments, when the temperature is less than another threshold, the mobile phone 100 increases an output voltage of the battery 142, so as to avoid abnormal shutdown due to low temperature.

A bone conduction sensor 180M may obtain a vibration signal. In some embodiments, the bone conduction sensor 180M may obtain a vibration signal of a human acoustic vibration bone. The bone conduction sensor 180M may also contact a human pulse to receive a blood pressure beat signal. In some embodiments, the bone conduction sensor 180M may alternatively be disposed in a headset for combination into a bone conduction headset. The audio module 170 may decode a voice signal based on a vibration signal that is of the acoustic vibration bone and that is obtained by the bone conduction sensor 180M, so as to implement a voice function. An application processor may decode heart rate information based on a blood pressure beating signal obtained by the bone conduction sensor 180M, so as to implement a heart rate detection function.

A key 190 includes a power-on key, a volume key, or the like. The key 190 may be a mechanical key. The key 190 may alternatively be a touch key. The mobile phone 100 may receive a key input, so as to generate a key signal input related to a user setting and function control of the mobile phone 100.

A motor 191 may generate a vibration prompt. The motor 191 may be configured to provide an incoming call vibration prompt, or may be configured to provide touch vibration feedback. For example, a touch operation performed on different applications (such as photographing and audio playback) may be corresponding to different vibration feedback effects. The motor 191 may also be corresponding to different vibration feedback effects when a touch operation is applied to different areas of the display 194. Different application scenarios (such as time reminder, information receiving, alarm clock, and gaming) may also be corresponding to different vibration feedback effects. The touch vibration feedback effect may alternatively be customized.

An indicator 192 may be an indicator, and may be configured to indicate a charging status, a power change, or may be used to indicate a message, a missed call, a notification, or the like.

A SIM card interface 195 is configured to connect to a SIM card. The SIM card may be inserted into the SIM card interface 195 or removed from the SIM card interface 195, so as to be in contact with or separate from the mobile phone 100. The mobile phone 100 may support one or N SIM card interfaces, where N is a positive integer greater than 1. The SIM card interface 195 can support a Nano SIM card, a Micro SIM card, a SIM card, and the like. A plurality of cards may be inserted into a same SIM card interface 195 at a time. The plurality of cards may be of the same type or different types. The SIM card interface 195 may be compatible with different types of SIM cards. The SIM card interface 195 may also be compatible with an external memory card. The mobile phone 100 interacts with a network by using a SIM card, so as to implement functions such as making a call and data communication. In some embodiments, the mobile phone 100 uses an eSIM, that is, an embedded SIM card. The eSIM card may be embedded in the mobile phone 100, and cannot be separated from the mobile phone 100.

It should be understood that the structure shown in this embodiment of this application does not constitute a specific limitation on the mobile phone 100. In some other embodiments of this application, the mobile phone 100 may include more or fewer components than those shown in the figure, or some components are combined, or some components are split, or a different component arrangement is used. The components shown may be implemented by hardware, software, or a combination of software and hardware.

A software system of the electronic device may use a hierarchical architecture, an event-driven architecture, a micronucleus architecture, a microservice architecture, or a cloud architecture. In this embodiment of this application, an android system with a hierarchical architecture is used as an example to describe a software architecture of an electronic device.

Figure 6:
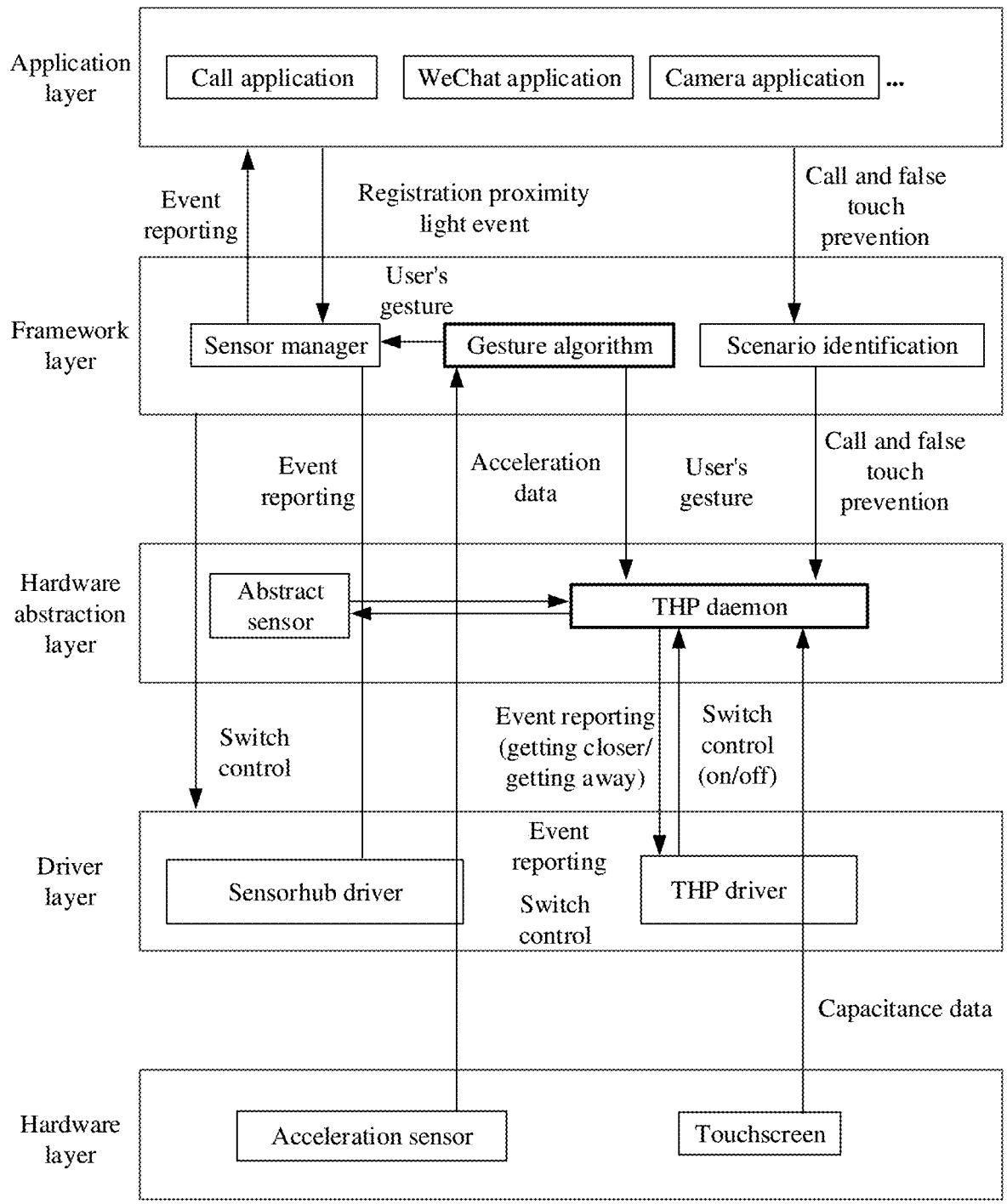
FIG. 6 is a possible software architecture of an electronic device according to an embodiment of this application.

Referring to FIG. 6, a software architecture of an electronic device may include a hardware layer, a driver layer, a hardware abstraction layer (hardware abstraction layer, HAL) layer, a framework layer, and an application layer.

The application layer may send an application registration proximity light event to the framework layer to require the framework layer to enable a proximity light function. The proximity light function refers to a function of determining, by using a proximity light sensor, that an obstruction is getting closer to or getting away from a touchscreen, which is described in the background. Although the proximity light sensor may not be used in this embodiment of this application, but a touchscreen is used to sense that the obstruction is getting closer to or getting away from touchscreen, for an application at the application layer, a proximity detection function may still be enabled by using a registration proximity light event. Certainly, a name of the proximity light event may also be changed, for example, changed to "proximity detection event", provided that a function of detecting that the obstruction is getting closer to or getting away from the touchscreen can be represented. This is not limited in this embodiment of this application.

Acceleration data output by an acceleration sensor may be used to determine a gesture (for example, picking up, putting down, or flipping) of the user by using a gesture algorithm at the framework layer.

An integrated circuit (integrated circuit, IC) of the touchscreen may send original data (a capacitance value generated at each contact position) generated when the touchscreen senses the obstruction to a touch host processing (touch host processing, THP) daemon.

In this embodiment of this application, gesture determining may include two determining stages: a small-gesture determining stage and a large-gesture determining stage. A difference between the large-gesture determining stage and the small-gesture determining stage lies in different sampling frequency and different corresponding sampling time of a gesture algorithm, and a total quantity of sampling points corresponding to the small-gesture determining stage is less than a total quantity of sampling points corresponding to the large-gesture determining stage.

Small-gesture determining stage: A gesture algorithm at the framework layer determines, based on acceleration data sampled by the acceleration sensor in a first period, whether a gesture of the user is a preset gesture (for example, picking up or putting down). If yes, the framework layer triggers the THP daemon at the hardware abstraction layer to run a THP algorithm. The THP daemon may input capacitance data reported by the touchscreen into the THP algorithm, to obtain a calculation result (the obstruction is getting closer to or getting away from the touchscreen), and generate, based on the calculation result, a corresponding getting-closer event or a getting-away event for reporting.

Large-gesture determining stage: In a process in which the THP daemon runs the THP algorithm, the gesture algorithm at the framework layer may continue to receive the acceleration data reported by the acceleration sensor, and then determine, based on acceleration data sampled by the acceleration sensor in a third period, whether a gesture of the user is a preset gesture (for example, picking up or putting down), where the third period is longer than the first period, and an end time of the third period is later than an end time of the first period.

The THP algorithm of the THP daemon obtains an event (for example, getting-closer or getting-away) based on the gesture of the user, a result of scenario recognition (for example, making a call or false touch prevention), and capacitance data from a touchscreen, and reports the event to a sensor manager. The capacitance data that is input into the THP algorithm may be the capacitance data sensed at the contacts in all areas of the touchscreen, or may be only the capacitance data sensed at the contacts in an edge area of the touchscreen (for example, the capacitance data sensed at the contacts in the first three rows, the last three rows, the left three columns, or the right three columns on the touchscreen).

The sensor manager may send a switch control instruction to the THP daemon. For example, the sensor manager may deliver an enabling instruction based on a gesture of the user (a small gesture) recognized by a gesture algorithm; and after receiving the enabling instruction delivered by the sensor manager, the THP driver drives the THP daemon to run the THP algorithm. The sensor manager may further deliver a disabling instruction based on a getting-closer event sent by the THP daemon, or deliver a disabling instruction based on a gesture of the user (a large gesture) recognized by the gesture algorithm, so that the THP algorithm of the THP daemon sleeps to reduce power consumption.

The THP algorithm and the gesture algorithm may run in an application chip of a system on chip (system on chip, SOC). Further, to reduce power consumption, the gesture algorithm may run in a sensorhub (sensorhub) chip of the application chip.

This embodiment of this application may be applied to scenarios such as making a call or a third-party application (such as WeChat) call. For example, after detecting, based on a relatively small amount of acceleration data, that a gesture performed by the user on the electronic device is lifting, the processor starts to detect whether an obstruction is getting closer to the touchscreen. When detecting that the obstruction is getting closer to the touchscreen, the processor turns off the touchscreen to reduce power consumption of the electronic device, or when detecting that the obstruction is getting closer to the touchscreen and re-determines, based on more acceleration data, that the gesture performed by the user on the electronic device is lifting, the processor turns off the touchscreen to reduce power consumption of the electronic device. For example, when detecting, based on a relatively small amount of acceleration data, that the gesture performed by the user on the electronic device is putting down, the processor starts to detect whether the obstruction is getting away from the touchscreen. If it is detected that the obstruction is getting away from the touchscreen, the touchscreen is turned on to facilitate operation of the user, or if it is detected that the obstruction is getting away from the touchscreen, and it is re-determined, based on more acceleration data, that the gesture performed by the user on the electronic device is putting down, the touchscreen is turned on to facilitate operation of the user.

This embodiment of this application may be further applied to a false touch prevention scenario. For example, the electronic device is placed in a pocket, and a power-on key is incorrectly pressed for a reason such as a movement of the user, so that the touchscreen is turned on and starts to detect whether a distance between an obstruction and the touchscreen is less than or equal to a preset value. If the distance between the obstruction and the touchscreen is less than or equal to the preset value, prompt information is displayed, so as to remind the user that the obstruction is blocking the touchscreen; or when it is detected that the distance between the obstruction and the touchscreen is less than or equal to the preset value, and a posture change of the electronic device after recognition based on acceleration data has a periodic change rule, it may be considered that the touchscreen is incorrectly touched, and the screen is turned off to save power consumption.

It should be understood that the software program and/or module corresponding to the software architecture in FIG. 6 may be stored in the internal memory 121 in the mobile phone 100 shown in FIG. 3.

The following describes in detail the technical solutions provided in the embodiments of this application by using two specific embodiments. In the following embodiments, that the technical solution is used in the mobile phone 100 is used as an example.

Embodiment 1

Figure 7:
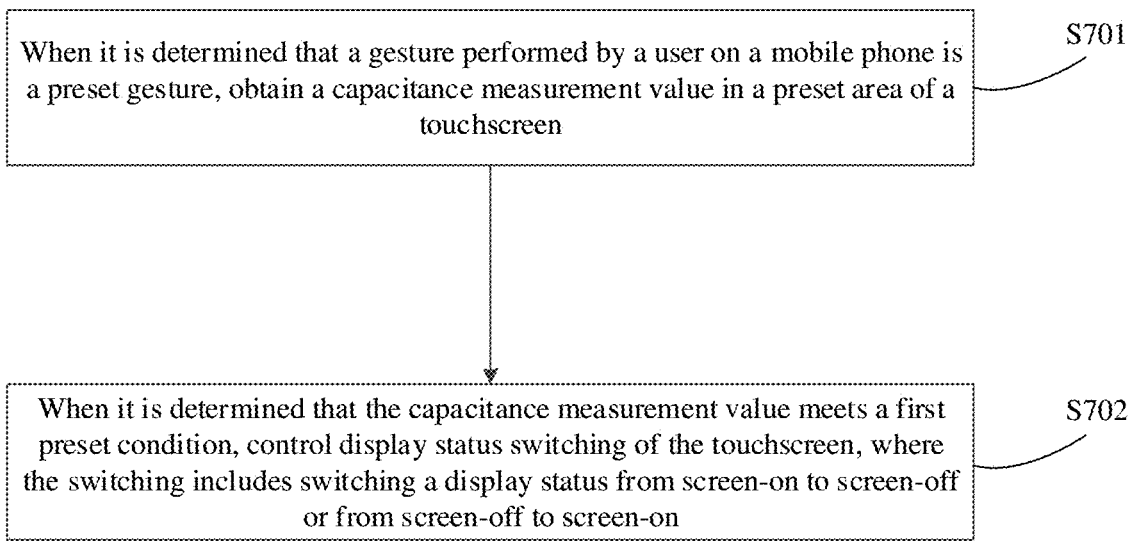
FIG. 7 is a flowchart of a display control method according to an embodiment of this application.

FIG. 7 is a flowchart of a display control method according to an embodiment of this application. The method includes the following steps.

S701. When it is determined that a gesture performed by a user on a mobile phone is a preset gesture, obtain a capacitance measurement value in a preset area of a touchscreen.

Specifically, when a processor requests, by using an application registration proximity light event at an application layer (for example, a registration proximity light event when WeChat starts a call process), a framework layer to enable a proximity light function, the framework layer starts to run a gesture algorithm. An acceleration sensor at the hardware layer reports collected acceleration data to the framework layer, and a gesture algorithm at the framework layer calculates, based on the acceleration data, that the gesture performed by the user on the mobile phone is the preset gesture. The preset gesture may be lifting, putting down, or flipping.

Figure 8:
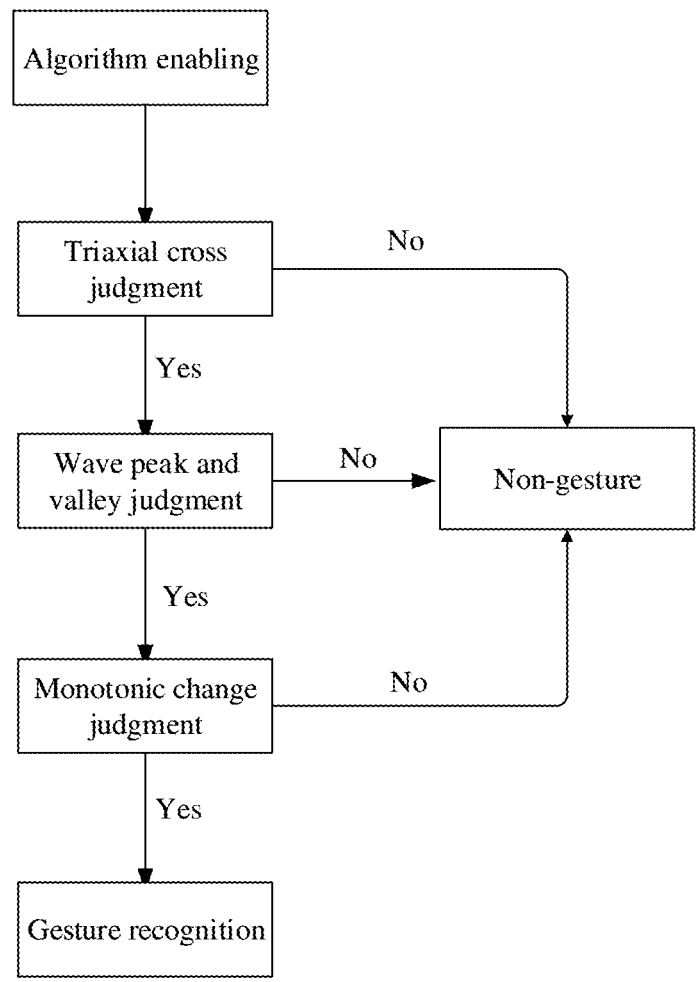
FIG. 8 is a flowchart of a gesture algorithm according to an embodiment of this application.

Referring to FIG. 8, the gesture algorithm may include three determining logics: (1) relative mobility. Once an direction of acceleration and any one of the three axes of the spatial coordinate system (that is, the x-axis, the y-axis, and the z-axis) cross, it is considered that the gesture of the mobile phone changes, and a gesture such as picking up, putting down, or flipping may occur. This logic does not distinguish between picking up or putting down, but only distinguishes between stationary and moving states. (2) Monotonicity. When acceleration data of a specific quantity of sampling points increases monotonically or decreases monotonically, it may be determined that a gesture such as picking up, putting down, or flipping may occur. The gesture algorithm may filter out, by using this logic, influence of some abrupt noise on gesture determining accuracy. (3) Non-periodicity. A quantity of peaks and valleys of acceleration data is determined. If the quantity of peaks and valleys is less than a specific value, it is considered that a picking up gesture may occur; otherwise, it is determined that a mobile phone moves periodically, for example, if a user runs at a constant speed, the mobile phone is periodically shaking, and the quantity of peaks and valleys is relatively large. This logic can reduce a false touch rate. The processor determines that the preset gesture occurs only when it is determined that the foregoing three determining logics are all satisfied.

Further, when the gesture performed by the user on the mobile phone is one of lifting, putting down, or flipping, the sensor manager at the framework layer may send an enabling instruction to a THP daemon, and the THP daemon may input the capacitance measurement value reported by the touchscreen into a THP algorithm to obtain a calculation result (the obstruction is getting closer or getting away from the touchscreen), and generate, based on the calculation result, a corresponding getting-closer or getting-away event for reporting.

Figure 9:
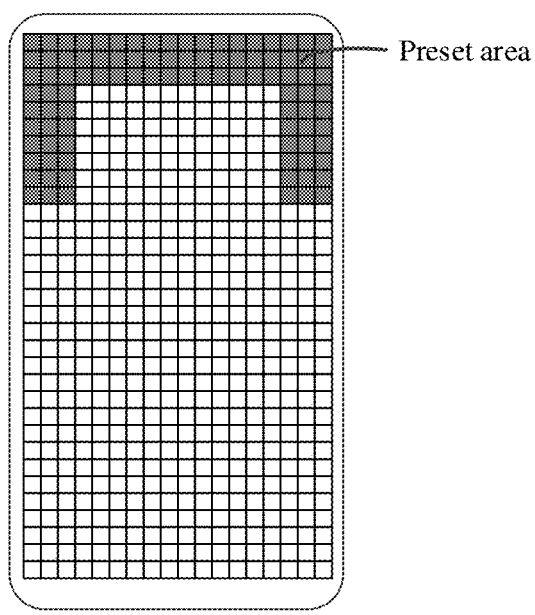
FIG. 9 is a schematic diagram of a preset area according to an embodiment of this application.

The capacitance measurement value that is input into the THP algorithm is a capacitance measurement value in a preset area of the touchscreen. The preset area may be an area that is in the touchscreen and in which a capacitance measurement value is less interfered with by deformation of a metal sheet. For example, contacts in the touchscreen forms a contact array, and the preset area may be a contact area formed by the first three rows in the contact array, a contact area formed by the last three rows in the contact array, a contact area formed by the left three columns in the contact array, a contact area formed by the right three column in the contact array, or the like. This is not specifically limited in this embodiment of this application. In a possible example, referring to FIG. 9, the preset area includes a contact area formed by the first to the third rows, a contact area formed by the left three columns in the fourth to the tenth rows, and a contact area formed by the right three columns in the fourth to the tenth rows.

The capacitance measurement value may be a capacitance measurement value in a set period. For example, the set period may refer to a preset quantity of frames, for example, a capacitance measurement value of five consecutive frames in the preset area of the touchscreen is obtained.

S702. When it is determined that the capacitance measurement value meets a first preset condition, control display status switching of the touchscreen, where the switching includes switching a display status from screen-on to screen-off or from screen-off to screen-on.

Specifically, after receiving the getting-closer or getting-away event reported by the THP daemon, the framework layer in the processor starts a screen-off or screen-on procedure, and indicates the driver layer to complete the screen-off or screen-on procedure. If the event is a getting-closer event, the screen-off procedure is started; or if the event is a getting-away event, the screen-on procedure is started.

In this embodiment of this application, the THP daemon may determine a change trend (that is, getting closer or getting away) of a distance between the obstruction and the touchscreen based on a change trend of the capacitance measurement value. For example, when the distance between the obstruction and the touchscreen becomes smaller (that is, getting closer), a capacitance measurement value of a contact where the touchscreen is close to the obstruction increases; or when the distance between the obstruction and the capacitive touchscreen becomes larger (that is, getting away), the capacitance measurement value of the contact where the touchscreen is close to the obstruction decreases.

The first preset condition corresponding to a scenario in which the obstruction is getting closer to the touchscreen may be different from the first preset condition corresponding to a scenario in which the obstruction is getting away from the touchscreen. Specifically, in the scenario in which the obstruction is getting closer to the touchscreen, the first preset condition may include: A capacitance measurement value in a preset area of the touchscreen meets a monotonically increasing trend in the first period, and a capacitance measurement value at an end time of the first period is greater than a first preset threshold; and in the scenario in which the obstruction is getting away from the touchscreen, the first preset condition may include: A capacitance measurement value in a preset area of the touchscreen meets a monotonically decreasing trend in the first period, and a capacitance measurement value at an end time of the first period is less than a second preset threshold. The second preset threshold is less than the first preset threshold.

Optionally, after the framework layer starts the screen-off or screen-on procedure, the sensor manager at the framework layer may further deliver a disabling instruction, so that the THP algorithm of the THP daemon sleeps to reduce power consumption.

It should be noted that the touchscreen of the mobile phone in this embodiment may be the touchscreen shown in FIG. 3, or may be the touchscreen shown in FIG. 4. This is not limited in this embodiment of this application.

In an optional implementation, the THP algorithm is implemented at the framework layer. Therefore, to reduce power consumption, after the touchscreen is getting closer to the obstruction, the touchscreen may not be powered off, but enters the low-power mode. In this case, the THP algorithm is disabled. The mobile phone exits the low-power mode only when being triggered by a gesture (for example, the user puts down or flips the mobile phone). In this case, the mobile phone wakes up the THP algorithm (that is, the sensor manager at the framework layer sends an enabling instruction to the THP daemon).

In this embodiment, the processor selects an area (that is, the foregoing preset area) that is in the touchscreen and that is corresponding to a metal plate that is not susceptible to deformation to generate a capacitance measurement value to detect whether the obstruction is getting closer to or getting away from the touchscreen. Because the capacitance value corresponding to this area may be less interfered with, a calculation result (that is, getting closer or getting away) is more accurate than a result (that is, getting closer or getting away) obtained through calculation based on a capacitance value of an entire screen, so that proximity detection accuracy of the electronic device can be improved, and the display status of the electronic device can be more accurately controlled.

Embodiment 2

Figure 10:
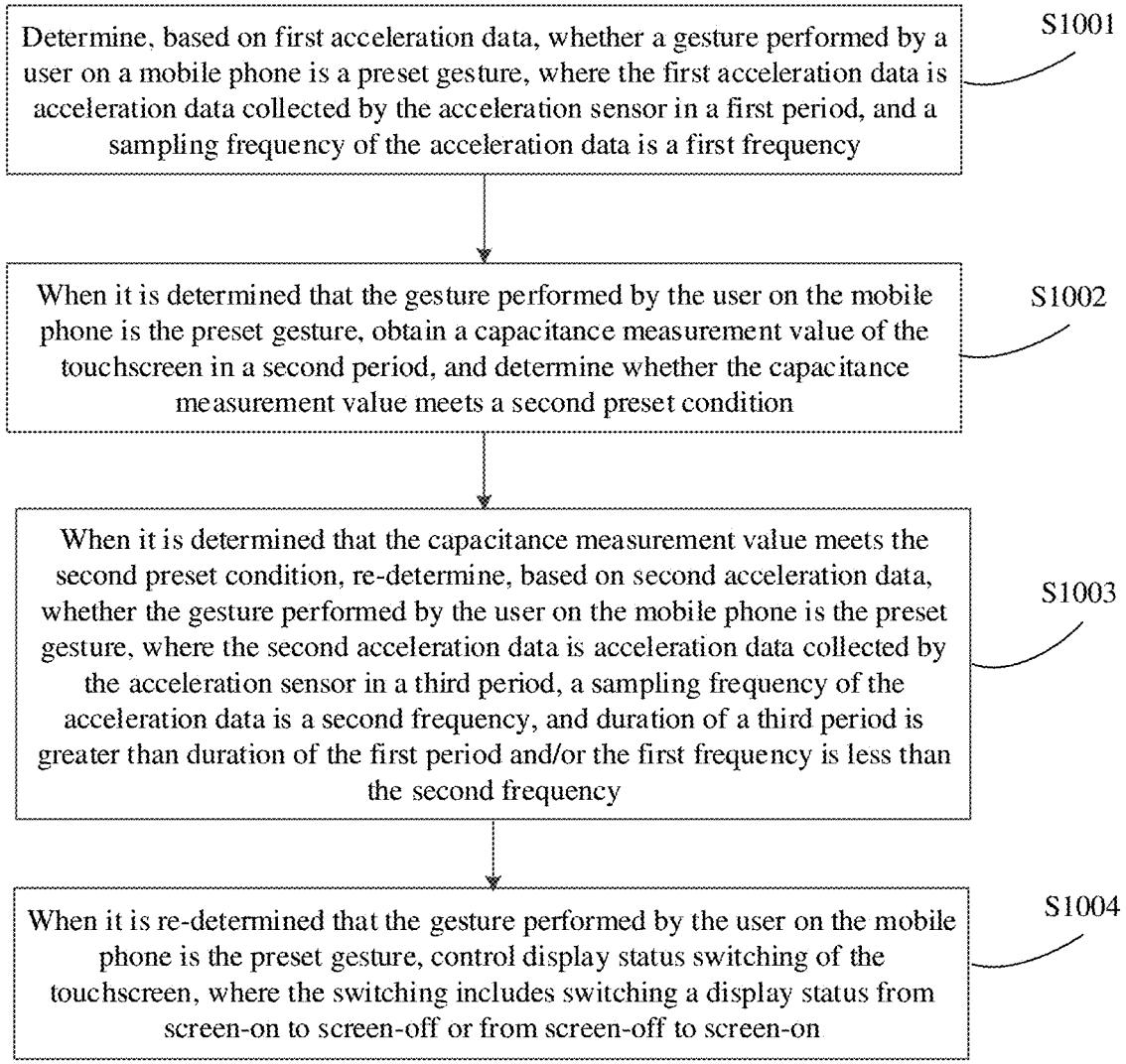
FIG. 10 is a flowchart of another display control method according to an embodiment of this application.

FIG. 10 is a flowchart of another display control method according to an embodiment of this application. The method includes the following steps.

S1001. Determine, based on first acceleration data, whether a gesture performed by a user on a mobile phone is a preset gesture, where the first acceleration data is acceleration data collected by the acceleration sensor in a first period, and a sampling frequency of the acceleration data is a first frequency.

Specifically, when a processor requests, by using an application registration proximity light event at an application layer (for example, a registration proximity light event when WeChat starts a call process), a framework layer to enable a proximity light function, the framework layer starts to run a gesture algorithm. After receiving the acceleration data that is collected in the first period and that is reported by the acceleration sensor at the hardware layer, the framework layer calculates, by using the gesture algorithm, that a gesture performed by the user on the mobile phone is a preset gesture, that is, the foregoing small gesture. For a small-gesture determining logic of the gesture algorithm, refer to the determining logic of the gesture algorithm in Embodiment 1. Details are not described herein again.

S1002. When it is determined that the gesture performed by the user on the mobile phone is the preset gesture, obtain a capacitance measurement value of the touchscreen in a second period, and determine whether the capacitance measurement value meets a second preset condition.

Specifically, after the processor determines, by using the framework layer, that the gesture performed by the user on the mobile phone is the preset gesture, the sensor manager at the framework layer may send an enabling instruction to the THP daemon, and the THP daemon may input the capacitance measurement value collected by the touchscreen in the second period into the THP algorithm, to obtain a calculation result (the obstruction is getting closer to or getting away), and generate, based on the calculation result, a corresponding getting-closer or getting-away event for reporting. For a specific implementation of the THP algorithm, refer to a specific implementation of the THP algorithm in the embodiments. Details are not described herein again. For a specific implementation of the preset gesture, refer to a specific implementation of the preset gesture in Embodiment 1. Details are not described herein again.

A start time of the second period may be an end time of the first period, or the start time of the second period may be later than the end time of the first period.

The capacitance measurement value of the touchscreen in the second period may be a capacitance measurement value detected at contacts of the entire touchscreen, or may be a capacitance measurement value detected in some areas of the touchscreen. This is not specifically limited in this embodiment of this application. For example, the capacitance measurement value may be a capacitance measurement value detected in the preset area shown in FIG. 9.

It should be noted that the second preset condition herein may be the same as or different from the first preset condition in Embodiment 1. This is not limited in this embodiment of this application. For a case in which the second preset condition is the same as the first preset condition in Embodiment 1, refer to a specific implementation of the first preset condition in Embodiment 1. Details are not described herein again. The following provides examples based on different cases: In a scenario in which an obstruction is getting closer to the touchscreen, the second preset condition may include: The capacitance measurement value meets a monotonically increasing trend in the second period, and a capacitance measurement value at an end time of the second period is not greater than a first preset threshold; and in a scenario in which the obstruction is getting away from the touchscreen, the second preset condition may include that: The capacitance measurement value meets a monotonically decreasing trend in the second period, and the capacitance measurement value at the end time of the second period is not less than a second preset threshold. The second preset threshold is less than the first preset threshold.

S1003. When it is determined that the capacitance measurement value meets the second preset condition, re-determine, based on second acceleration data, whether the gesture performed by the user on the mobile phone is the preset gesture, where the second acceleration data is acceleration data collected by the acceleration sensor in a third period, a sampling frequency of the acceleration data is a second frequency, and duration of a third period is greater than duration of the first period and/or the first frequency is less than the second frequency.

Specifically, after receiving the getting-closer or getting-away event reported by the THP process, the framework layer continues to run the gesture algorithm. The gesture algorithm re-determines, based on the second acceleration data reported by the acceleration sensor, whether the gesture of the user is the preset gesture, that is, the foregoing large-gesture determining stage. For a large-gesture determining logic, refer to the determining logic of the gesture algorithm in Embodiment 1. Details are not described herein again. A start time of the third period may be a start time of the first period. Certainly, the start time of the third period may alternatively be later than the start time of the first period. This is not limited herein.

In this embodiment of this application, the condition "duration of a third period is greater than duration of the first period and/or the first frequency is less than the second frequency" is set to ensure that a data volume (a total quantity of sampling points) of the second acceleration data is greater than a data volume (a total quantity of sampling points) of the first acceleration data, that is, to ensure that accuracy of determining a large gesture is greater than accuracy of determining a small gesture, thereby further ensuring proximity detection accuracy. That is, if the duration of the third period is not greater than the duration of the first period, the first frequency needs to be less than the second frequency; if the duration of the third period is greater than the duration of the first period, the first frequency may be less than or equal to the second frequency, but it is required to ensure that the data volume of the second acceleration collected in the third period is greater than the data volume of the first acceleration collected in the first period. Optionally, the first period may be a sub-period in the third period, that is, the second acceleration data may include the first acceleration data.

In this embodiment of this application, the first acceleration data corresponding to the small gesture and the second acceleration data corresponding to the large gesture are different based on a scenario requirement. Specifically, it is required that the first acceleration data corresponding to the small gesture cannot be misreported, and the first acceleration data should not be missed. For example, if a sampling frequency of the acceleration sensor in the first period is 100 Hz, and there are a total of 10 sampling points, a sum of a sampling time of the first acceleration data and a determining time of the small gesture is approximately 230 ms. It is required that the second acceleration data corresponding to the large gesture cannot be missed (that is, more data is required), and the second acceleration data should not be misreported. For example, if a sampling frequency of the acceleration sensor is also 100 Hz in a third period, and there are a total of 20 sampling points, a sum of a sampling time of the second acceleration data and a determining time of the large gesture is 400 ms.

S1004. When it is re-determined that the gesture performed by the user on the mobile phone is the preset gesture, control display status switching of the touchscreen, where the switching includes switching a display status from screen-on to screen-off or from screen-off to screen-on.

Specifically, after the framework layer re-determines, by running the gesture algorithm, that the gesture performed by the user on the mobile phone is the preset gesture, the framework layer starts a screen-off or screen-on procedure, and indicates the driver layer to complete the screen-off or screen-on procedure.

Optionally, after the framework layer starts the screen-off or screen-on procedure, the sensor manager at the framework layer may further deliver a disabling instruction, so that the THP algorithm of the THP daemon sleeps to reduce power consumption.

It should be noted that the touchscreen of the mobile phone in this embodiment may be the touchscreen shown in FIG. 3, or may be the touchscreen shown in FIG. 4. This is not limited in this embodiment of this application.

Figure 11:
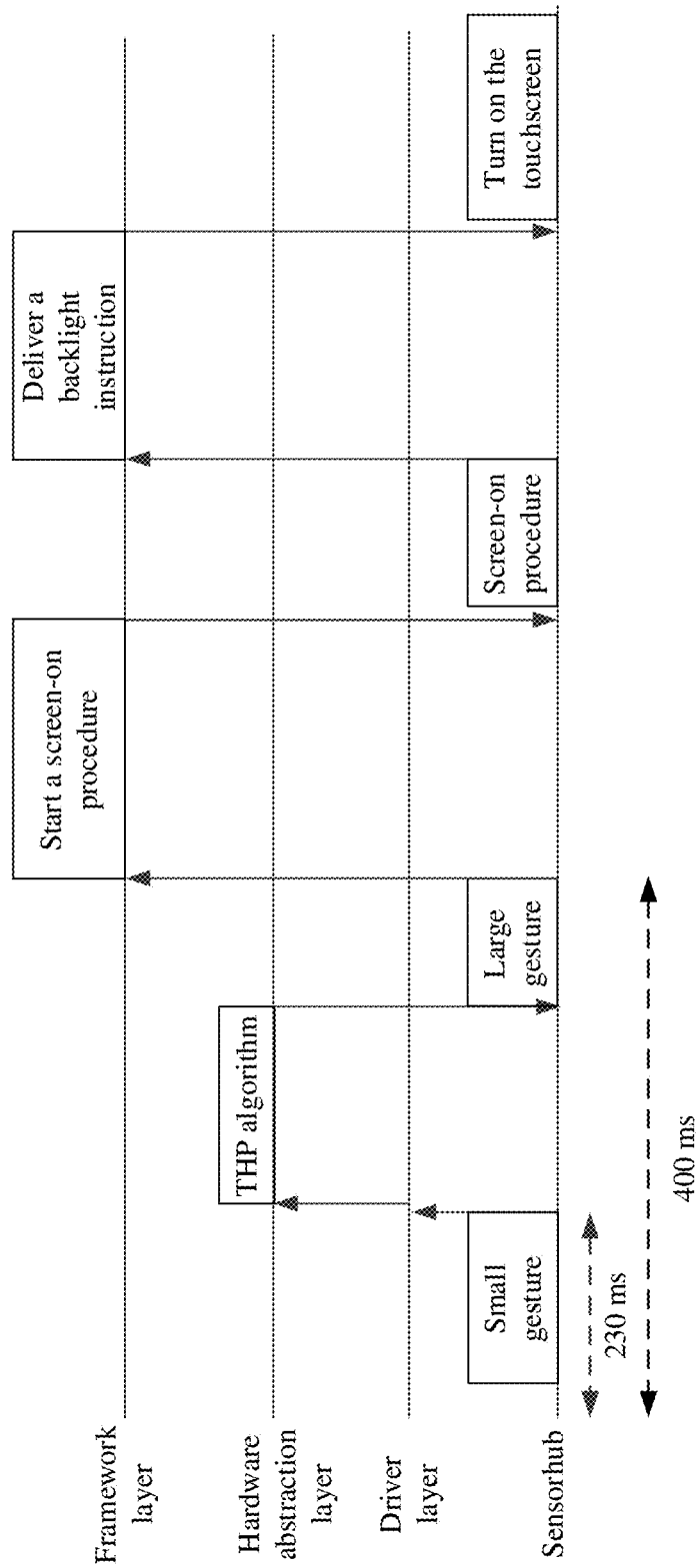
FIG. 11 is a schematic diagram of a time spent on turning on a touchscreen when an obstruction is getting away from the touchscreen.

For example, FIG. 11 is a schematic diagram of a time spent on turning on a touchscreen when an obstruction is getting away from the touchscreen (that is, a distance between the obstruction and the touchscreen increases) in a scenario of a call or a third-party application call. The processor runs a gesture algorithm at the framework layer. The gesture algorithm first determines, based on first acceleration data reported by an acceleration sensor, that a gesture of a user is putting down (in a small-gesture determining stage, a time from collecting acceleration data to outputting a gesture determining result is approximately 230 ms), and sends the gesture to a hardware abstraction layer by using a driver layer, and a THP daemon at the hardware abstraction layer starts a THP algorithm. In the THP algorithm, the THP daemon obtains a capacitance measurement value that is of five consecutive frames and that is reported by the touchscreen, and determines a distance between an obstruction and the touchscreen based on the capacitance measurement value. As the distance increases, the THP daemon determines that the obstruction is getting away from the touchscreen. After the distance between the obstruction and the touchscreen exceeds a set value, the THP daemon reports a getting-away event to the framework layer by using the driver layer. The framework layer continues to run the gesture algorithm, and the gesture algorithm re-determines, based on the second acceleration data reported by the acceleration sensor, that the gesture of the user is putting down (in a large-gesture determining stage, a time from collecting acceleration data to outputting a gesture determining result is approximately 400 ms). The framework layer starts the screen-on procedure and indicates the driver layer to complete the screen-on procedure. The framework layer delivers a backlight instruction to the driver layer to turn on the touchscreen.

Similarly, the THP algorithm is implemented at the framework layer. Therefore, to reduce power consumption, after the touchscreen is getting closer to the obstruction, the touchscreen may not be powered off, but enters the low-power mode. In this case, the THP algorithm is disabled. The mobile phone exits the low-power mode only when being triggered by a gesture (for example, the user puts down or flips the mobile phone). In this case, the THP algorithm is waked up (that is, the sensor manager at the framework layer sends an enabling instruction to the THP daemon), and the foregoing method in this embodiment of this application is performed.

Figure 12A:
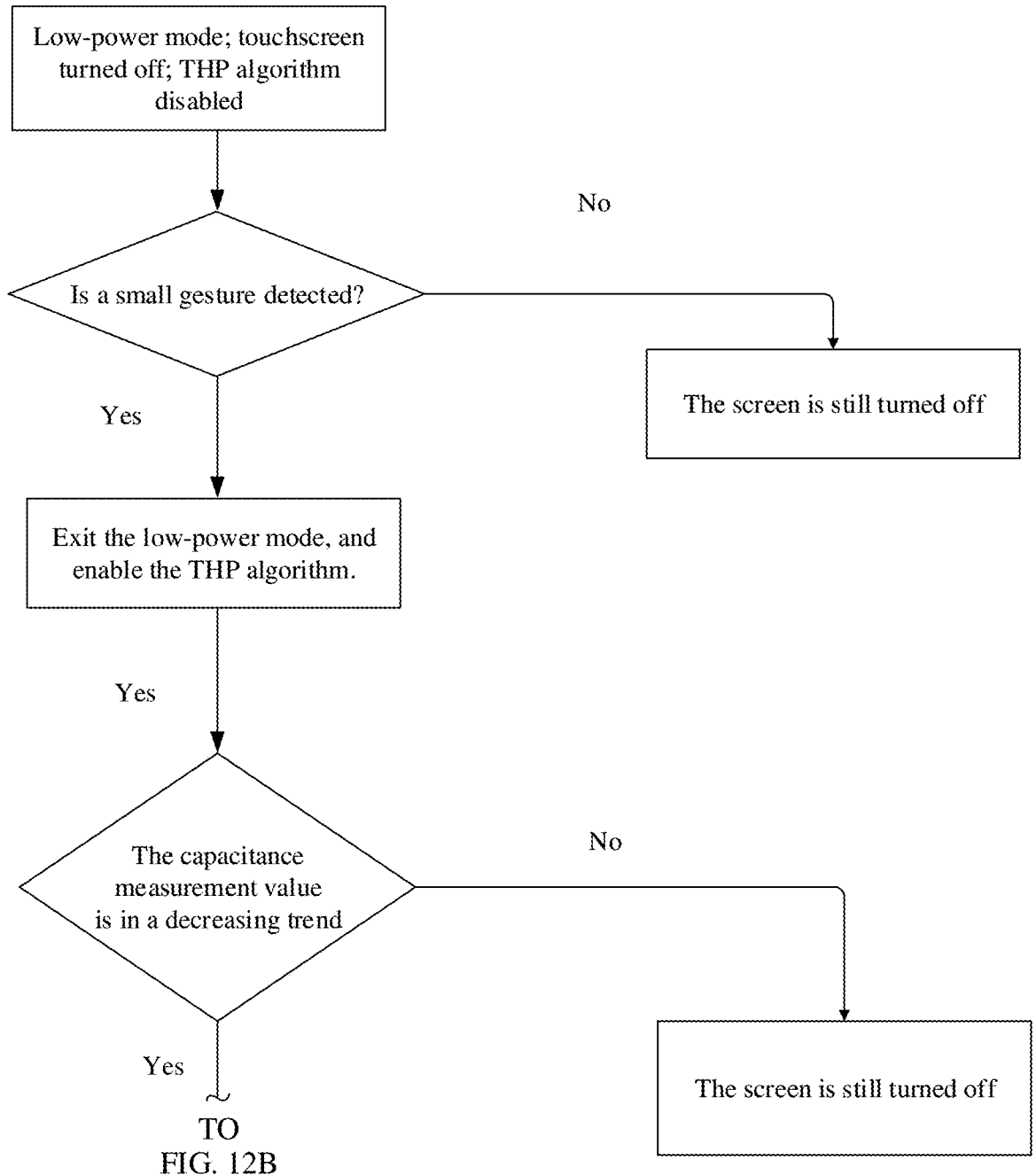
FIG. 12A-FIG. 12B are a flowchart of another display control method according to an embodiment of this application.
Figure 12B:
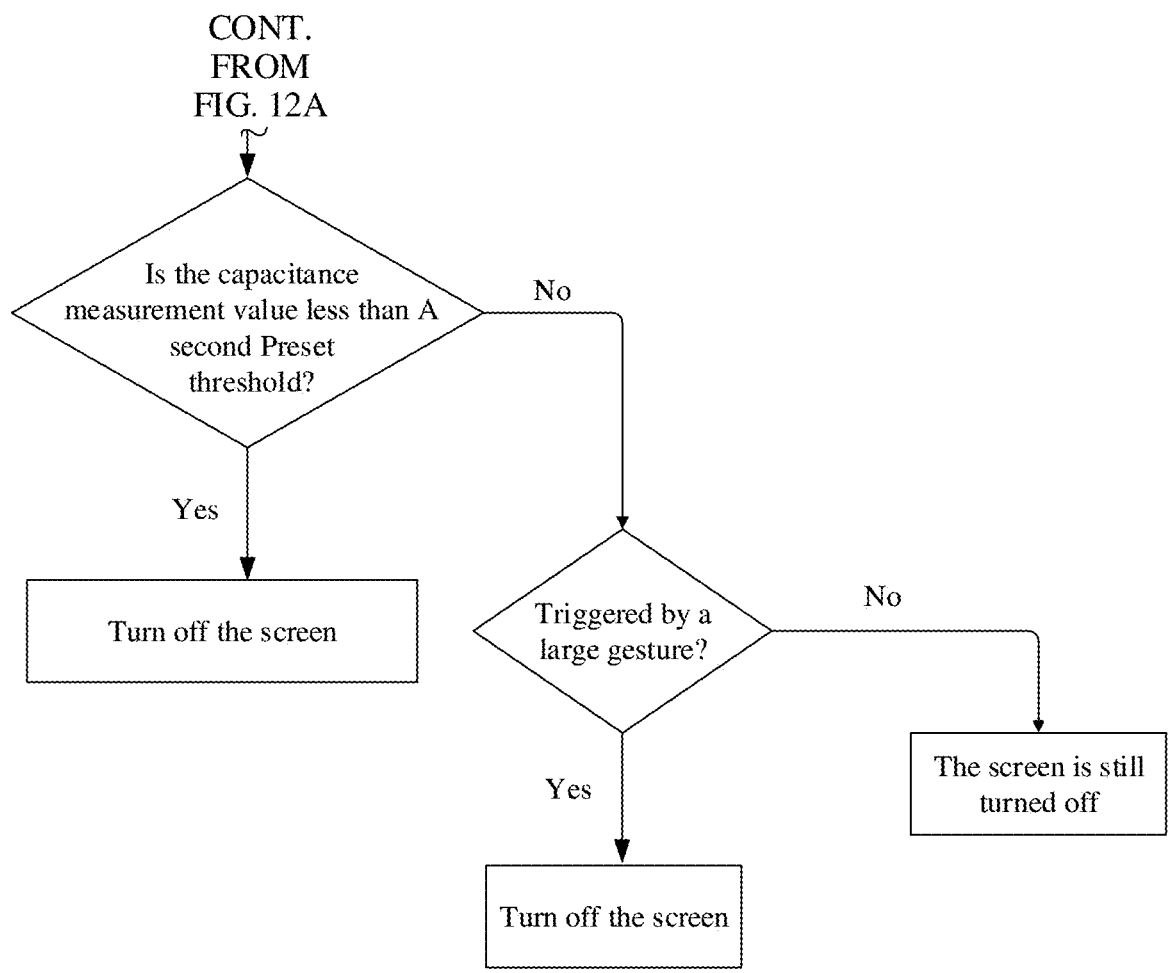

For example, referring to FIG. 12A-FIG. 12B, after the touchscreen is getting closer to the obstruction, the touchscreen may enter the low-power mode without being powered off. In the low-power mode, the touchscreen is in screen-off state, and the THP algorithm is disabled. If triggering by a small gesture is detected (for example, it is recognized, based on acceleration data in a relatively short period, that the user performs a gesture such as putting down a mobile phone or flipping the mobile phone), the touchscreen exits the low-power mode, and the THP algorithm is waked up; otherwise, the touchscreen continues to be in the low-power mode and is still turned off. After the THP algorithm is waked up, the capacitance measurement value of the touchscreen in the second period is obtained, and it is determined whether the capacitance measurement value in the preset period meets a monotonically decreasing trend. If yes, it is further determined whether the capacitance measurement value at the end time of the preset period is less than the second preset threshold; otherwise, it is further determined that the screen is still turned off. If the capacitance measurement value at the end time is less than the second preset threshold, the touchscreen is turned on; otherwise, the touchscreen continues to determine whether a large-gesture trigger condition is met (for example, it is recognized, based on acceleration data in a relatively long period, that the user performs a gesture such as putting down a mobile phone or flipping the mobile phone). If the large-gesture trigger condition is met, the touchscreen is turned on; otherwise, the screen is still turned off.

In this embodiment, after it is determined, through calculation based on the capacitance measurement value detected by the touchscreen, that the distance relationship between the obstruction and the mobile phone meets the second preset condition, a large-gesture determining step is added: determining, based on a posture change of the electronic device, whether the event that the obstruction is getting closer to or getting away from the electronic device is accidentally triggered; and after determining that the event is not accidentally triggered, which is equivalent to determining that the user has an intention to move the electronic device closer to or away from a human body, turning off/on the screen. In this way, even if the capacitance value sensed by the touchscreen is interfered with by the surrounding environment, the gesture determining step ensures display control accuracy of the electronic device, so that user experience is improved.

Figure 13:
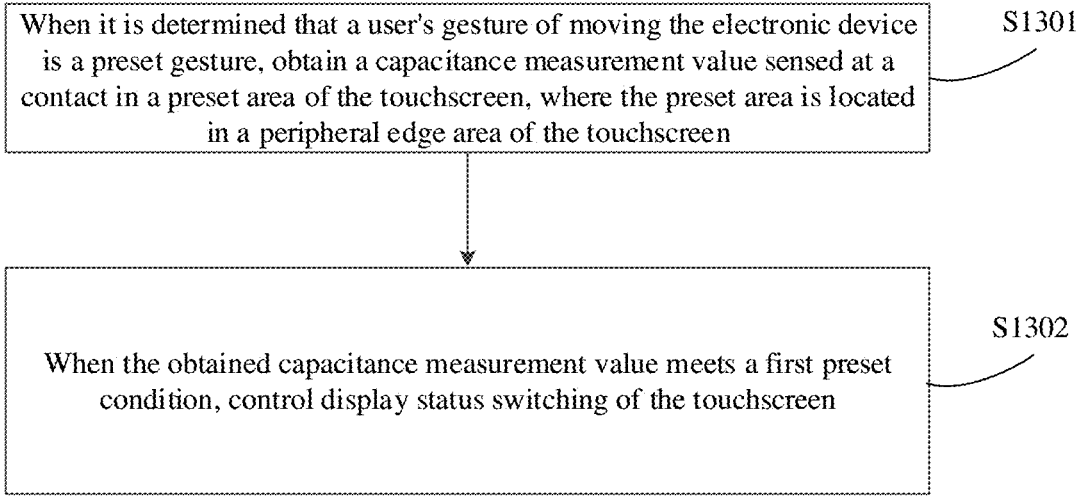
FIG. 13 is a flowchart of another display control method according to an embodiment of this application.

With reference to the foregoing embodiments and related accompanying drawings, an embodiment of this application further provides a display control method, and the method may be implemented in an electronic device (such as a mobile phone or a tablet computer) having a touchscreen. For example, a structure of the electronic device may be shown in FIG. 3, FIG. 4, FIG. 5A, FIG. 5B, or FIG. 5C. As shown in FIG. 13, the method may include the following steps:

S1301. When it is determined that a user's gesture of moving the electronic device is a preset gesture, obtain a capacitance measurement value sensed at a contact in a preset area of the touchscreen, where the preset area is located in a peripheral edge area of the touchscreen.

S1302. When the obtained capacitance measurement value meets a first preset condition, control display status switching of the touchscreen.

Figure 14:
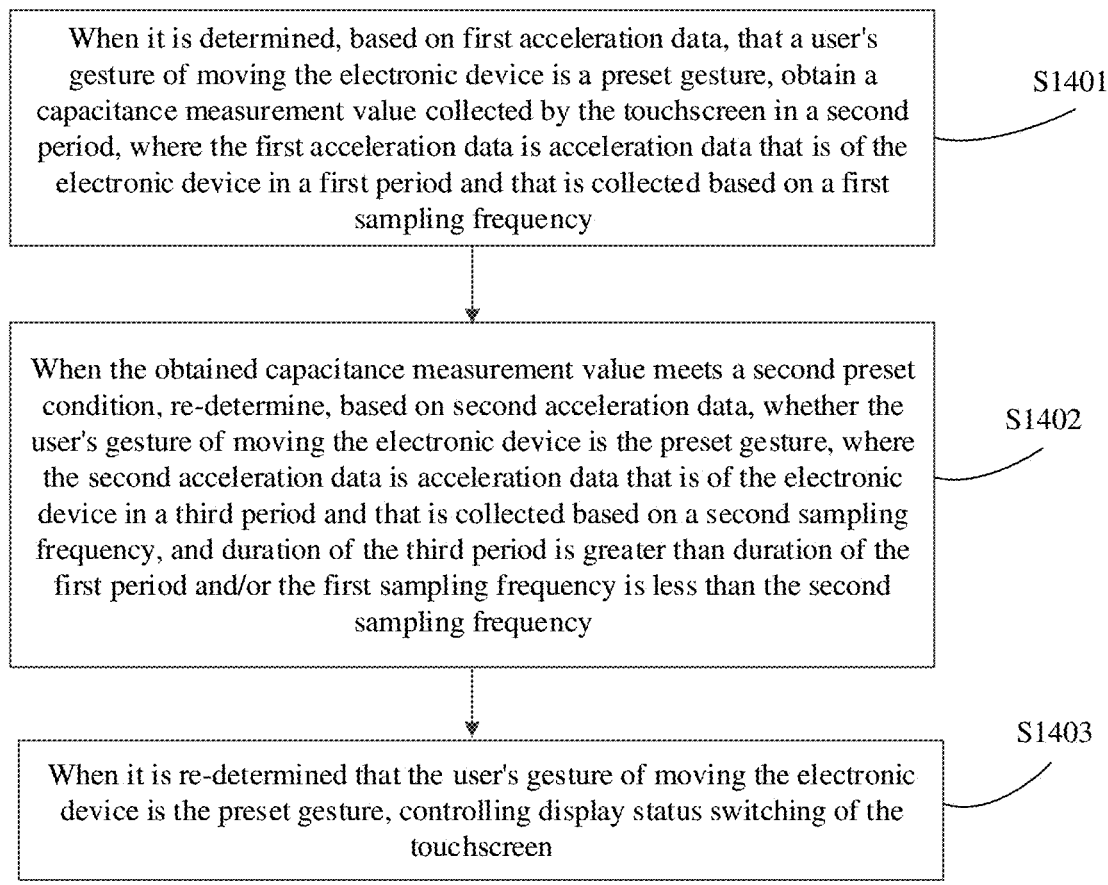
FIG. 14 is a flowchart of another display control method according to an embodiment of this application.

With reference to the foregoing embodiments and related accompanying drawings, an embodiment of this application further provides a display control method, and the method may be implemented in an electronic device (such as a mobile phone or a tablet computer) having a touchscreen. For example, a structure of the electronic device may be shown in FIG. 3, FIG. 4, FIG. 5A, FIG. 5B, or FIG. 5C. As shown in FIG. 14, the method may include the following steps:

S1401. When it is determined, based on first acceleration data, that a user's gesture of moving the electronic device is a preset gesture, obtain a capacitance measurement value collected by the touchscreen in a second period, where the first acceleration data is acceleration data that is of the electronic device in a first period and that is collected based on a first sampling frequency.

S1402. When the obtained capacitance measurement value meets a second preset condition, re-determine, based on second acceleration data, whether the user's gesture of moving the electronic device is the preset gesture, where the second acceleration data is acceleration data that is of the electronic device in a third period and that is collected based on a second sampling frequency, and duration of the third period is greater than duration of the first period and/or the first sampling frequency is less than the second sampling frequency.

S1403. When it is re-determined that the user's gesture of moving the electronic device is the preset gesture, controlling display status switching of the touchscreen.

The foregoing implementations of this application may be combined randomly to achieve different technical effects.

The following describes an apparatus provided in an embodiment of this application with reference to the accompanying drawings, so as to implement the foregoing method embodiments of this application.

Figure 15:
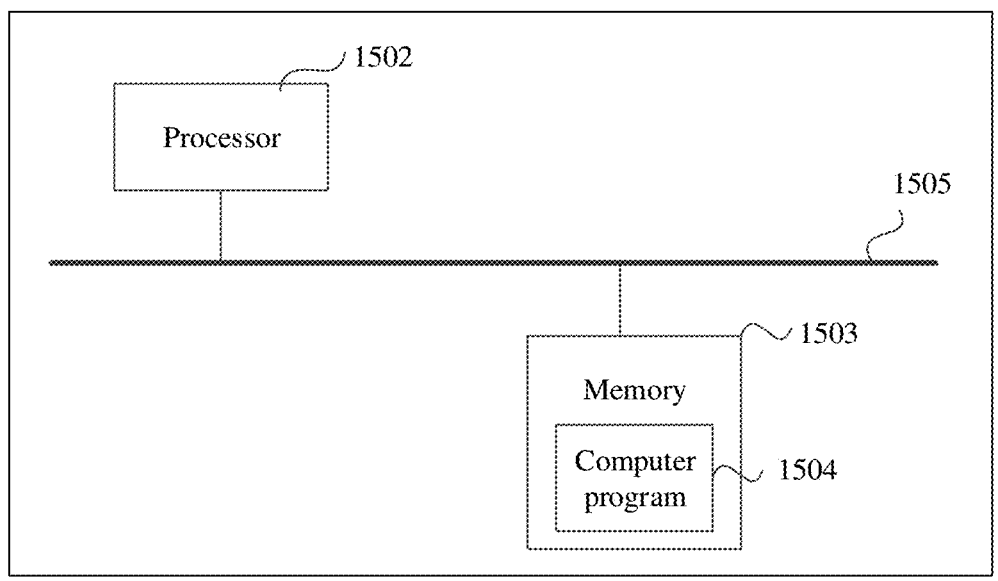
FIG. 15 is a possible schematic structural diagram of an electronic device according to an embodiment of this application.

As shown in FIG. 15, some other embodiments of this application disclose an electronic device. The electronic device may include one or more processors 1502, a memory 1503, and one or more computer programs 1504. The foregoing devices may be connected by using one or more communications buses 1505. The one or more computer programs 1504 are stored in the memory 1503 and configured to be executed by the one or more processors 1502, where the one or more computer programs 1504 include instructions, and the instructions may be used to perform all or some of the steps described in the embodiments shown in FIG. 3 to FIG. 14.

The processor 1502 may be a central processing unit (central processing unit, CPU) or an application-specific integrated circuit (application-specific integrated circuit, ASIC), may be one or more integrated circuits used to control program execution, or may be a baseband chip, or the like. There may be one or more memories 1503, and the memory 1503 may be a read-only memory (read-only memory, ROM), a random access memory (random access memory, RAM), a disk memory, or the like.

The electronic device shown in FIG. 15 may be a mobile phone, an iPad, a notebook computer, a smart TV, a wearable device (such as a smartwatch, a smart helmet, or a smart band), or the like. When the electronic device shown in FIG. 15 is a mobile phone, for a structure of the electronic device, refer to FIG. 3.

In the foregoing embodiments provided in this application, the methods provided in the embodiments of this application are described from a perspective of an electronic device (the mobile phone 100) as an executor. To implement functions in the foregoing methods provided in the embodiments of this application, the terminal device may include a hardware structure and/or a software module, so as to implement the foregoing functions by using a hardware structure, a software module, or a combination of a hardware structure and a software module. Whether a function in the foregoing functions is executed by using a hardware structure, a software module, or a combination of a hardware structure and a software module depends on a specific application and a design constraint of the technical solution.

As used in the foregoing embodiments, depending on the context, the term "when" can be interpreted as "if . . . ", "after . . . ", "in response to determining that . . . ", or "in response to detecting that . . . ". Similarly, depending on the context, the phrase "when it is determined that . . . " or "if it is detected that . . . (a stated condition or event)" can be interpreted as "if it is determined that . . . ", "in response to determining that . . . ", "when it is detected that . . . (the stated condition or event)", or "in response to detecting that . . . (the stated condition or event)".

All or some of the foregoing embodiments may be implemented by software, hardware, or a combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are completely or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For the purpose of explanation, the foregoing descriptions are described with reference to specific embodiments. However, the foregoing example discussions are not intended to be exhaustive, nor are they intended to limit the present application to the precise form disclosed. According to the foregoing teachings, many modifications and variations are possible. The embodiments are selected and described to fully illustrate the principles of the present application and its actual application, thereby enabling other persons of ordinary skill in the art to fully utilize the present application and various embodiments with various modifications suitable for the intended specific purpose.

What is claimed is:

1. A touchscreen, comprising a middle-frame screen compartment, a support member, a display module, and a touch module, wherein:
   the middle-frame screen compartment forms an accommodation space, the display module is disposed in the accommodation space formed by the middle-frame screen compartment, and the touch module is disposed on a side of the display module that faces away from the middle-frame screen compartment;
   a metal sheet is disposed on a side of the display module that faces the middle-frame screen compartment, and an edge of the metal sheet is fastened to both the middle-frame screen compartment and the display module; and
   the support member is disposed between the middle-frame screen compartment and the metal sheet and supports the metal sheet.

2. The touchscreen according to claim 1, wherein a first projection of the support member on a touch module side and a second projection of the metal sheet on the touch module side completely coincide with each other.

3. The touchscreen according to claim 1, wherein a first projection of the support member on a touch module side is located within a second projection of the metal sheet on a touch module side, and a distance between an edge of the second projection and a center of the first projection is less than a preset value.

4. The touchscreen according to claim 1, wherein the support member comprises a plurality of sub-components, and all sub-components of the plurality of sub-components are arranged at intervals in a first direction, wherein the first direction is any direction perpendicular to a direction in which the display module and the touch module are stacked.

5. The touchscreen according to claim 1, wherein the support member is an electrically insulating foam.

6. An electronic device, comprising the touchscreen according to claim 1.

7. A display control method, applied to an electronic device, wherein the electronic device comprises a middle-frame screen compartment, a support member, a display module, and a touch module, wherein:
the middle-frame screen compartment forms an accommodation space, the display module is disposed in the accommodation space formed by the middle-frame screen compartment, and the touch module is disposed on a side of the display module that faces away from the middle-frame screen compartment;
a metal sheet is disposed on a side of the display module that faces the middle-frame screen compartment, and an edge of the metal sheet is fastened to both the middle-frame screen compartment and the display module; and
the support member is disposed between the middle-frame screen compartment and the metal sheet and supports the metal sheet; and
the method comprises:
when it is determined that a user's gesture of moving the electronic device is a preset gesture, obtaining a capacitance measurement value sensed at a contact in a preset area of the touchscreen, wherein the preset area is located in a peripheral edge area of the touchscreen; and
when the obtained capacitance measurement value meets a first preset condition, controlling display status switching of the touchscreen.

8. The method according to claim 7, wherein the first preset condition comprises:
the capacitance measurement value is in a monotonically increasing trend in a first period, and a capacitance measurement value at an end time of the first period is greater than a first preset threshold; and
wherein the controlling display status switching of the touchscreen comprises:
controlling the display status of the touchscreen to switch from screen-on to screen-off.

9. The method according to claim 7, wherein the first preset condition comprises:
the capacitance measurement value is in a monotonically decreasing trend in a first period, and a capacitance measurement value at an end time of the first period is less than a second preset threshold; and
wherein the controlling display status switching of the touchscreen comprises:
controlling the display status of the touchscreen to switch from screen-off to screen-on.

10. An electronic device, comprising a touchscreen, a processor, and a memory, wherein the memory is configured to store one or more computer programs; and
when the one or more computer programs stored in the memory are executed by the processor, the electronic device is enabled to perform the method according to claim 7.

11. A computer readable storage medium, wherein the computer readable storage medium comprises a computer program, and when the computer program is run on an electronic device, the electronic device is enabled to perform the method according to claim 7.

12. A program product, comprising an instruction, wherein when the program product runs on an electronic device, the electronic device is enabled to perform the method according to claim 7.

13. A display control method, applied to an electronic device, wherein the electronic device comprises a middle-frame screen compartment, a support member, a display module, and a touch module, wherein:
the middle-frame screen compartment forms an accommodation space, the display module is disposed in the accommodation space formed by the middle-frame screen compartment, and the touch module is disposed on a side of the display module that faces away from the middle-frame screen compartment;
a metal sheet is disposed on a side of the display module that faces the middle-frame screen compartment, and an edge of the metal sheet is fastened to both the middle-frame screen compartment and the display module; and
the support member is disposed between the middle-frame screen compartment and the metal sheet and supports the metal sheet; and
the method comprises:
when it is determined, based on first acceleration data, that a user's gesture of moving the electronic device is a preset gesture, obtaining a capacitance measurement value collected by the touchscreen in a second period, wherein the first acceleration data is acceleration data that is of the electronic device in a first period and that is collected based on a first sampling frequency;
when the obtained capacitance measurement value meets a second preset condition, re-determine, based on second acceleration data, whether the user's gesture of moving the electronic device is the preset gesture, wherein the second acceleration data is acceleration data that is of the electronic device in a third period and that is collected based on a second sampling frequency, and duration of the third period is greater than duration of the first period and/or the first sampling frequency is less than the second sampling frequency; and
when it is re-determined that the user's gesture of moving the electronic device is the preset gesture, controlling display status switching of the touchscreen.

14. The method according to claim 13, wherein:
the second preset condition comprises: the capacitance measurement value is in a monotonically increasing trend in the second period, and a capacitance measurement value at an end time of the second period is not greater than a first preset threshold; and
the controlling display status switching of the touchscreen comprises:
controlling the display status of the touchscreen to switch from screen-on to screen-off.

15. The method according to claim 13, wherein:
the second preset condition comprises: the capacitance measurement value changes in a monotonically decreasing trend in a second period, and a capacitance measurement value at an end time of the second period is not less than a second preset threshold; and
the controlling display status switching of the touchscreen comprises:

controlling the display status of the touchscreen to switch from screen-off to screen-on.

16. An electronic device, comprising a touchscreen, a processor, and a memory, wherein the memory is configured to store one or more computer programs; and
when the one or more computer programs stored in the memory are executed by the processor, the electronic device is enabled to perform the method according to claim 13.

17. A computer readable storage medium, wherein the computer readable storage medium comprises a computer program, and when the computer program is run on an electronic device, the electronic device is enabled to perform the method according to claim 13.

18. A program product, comprising an instruction, wherein when the program product runs on an electronic device, the electronic device is enabled to perform the method according to claim 13.

* * * * *